FLUID JET PROCESS FOR TWISTING YARN

Original Filed May 4, 1959 6 Sheets-Sheet 1

INVENTORS
ALVIN L. BREEN
MARTIN V. SUSSMAN

BY Raymond E. Blomberg

ATTORNEY

FLUID JET PROCESS FOR TWISTING YARN

Original Filed May 4, 1959 6 Sheets-Sheet 2

INVENTOR
ALVIN L. BREEN
MARTIN V. SUSSMAN

BY Raymond E. Blomstedt

ATTORNEY

FLUID JET PROCESS FOR TWISTING YARN

Original Filed May 4, 1959 6 Sheets-Sheet 5

INVENTORS
ALVIN L. BREEN
MARTIN V. SUSSMAN

BY Raymond E. Blanchard
ATTORNEY

FLUID JET PROCESS FOR TWISTING YARN

Original Filed May 4, 1959 6 Sheets-Sheet 4

INVENTORS
ALVIN L. BREEN
MARTIN V. SUSSMAN

BY Raymond E. Blo...
ATTORNEY

FLUID JET PROCESS FOR TWISTING YARN

Original Filed May 4, 1959 6 Sheets-Sheet 5

INVENTORS
ALVIN L. BREEN
MARTIN V. SUSSMAN
BY Raymond E. Blomstedt
ATTORNEY

FLUID JET PROCESS FOR TWISTING YARN

Original Filed May 4, 1959 6 Sheets-Sheet 6

INVENTORS
ALVIN L. BREEN
MARTIN V. SUSSMAN
BY Raymond E. Blomstedt
ATTORNEY

United States Patent Office

Re. 27,717
Reissued Aug. 7, 1973

27,717

FLUID JET PROCESS FOR TWISTING YARN

Alvin Leonard Breen, West Chester, Pa., and Martin Victor Sussman, Istanbul, Turkey, by E. I. du Pont de Nemours and Company, Wilmington, Del., assignee Original No. 3,279,164, dated Oct. 18, 1966, Ser. No. 810,671, May 4, 1959. Application for reissue Aug. 19, 1971, Ser. No. 114,899

Int. Cl. D02g *1/02, 1/16*

U.S. Cl. 57—157 TS 17 Claims

Matter enclosed in heavy brackets [ ] appears in the original patent but forms no part of this reissue specification; matter printed in italics indicates the additions made by reissue.

This application is a continuation-in-part of application S.N. 598,135, filed July 16, 1956, by Alvin L. Breen and Martin V. Sussman, now U.S. Patent No. 3,009,309, issued November 21, 1961, which in turn was a continuation-in-part of application S.N. 443,313, filed July 14, 1954, by Alvin L. Breen, and now abandoned.

This invention relates to a process for twisting, bulking, or crimping yarns continuously, and to products produced thereby.

It has long been known that a yarn can be crimped by twisting, setting the yarn in the twisted configuration, and then back-twisting the yarn. In a batch process true twist is inserted into the yarn, the yarn is packaged, heat-set, and then back-twisted to give the yarn its crimp and bulk. When such a process is carried out continuously, a temporary twist is imparted to the threadline by a false-twister while simultaneously exposing the yarn to yarn-setting means, e.g., heat, steam, solvent, etc. The temporary twist is removed immediately after leaving the twister, and the yarn is taken up on a suitable package. Examples of batchwise processes for imparting twist are disclosed in U.S. 2,019,185, Kagi; U.S. 2,019,183, Heberlein; U.S. 2,197,896, Miles; and U.S. 2,564,245, Billion. Continuous processes and apparatus for false-twisting are disclosed in U.S. 2,089,198, Finlayson et al.; U.S. 2,089,-199, Finlayson et al.; U.S. 2,189,239, Whitehead; U.S. 2,111,211, Finlayson et al.; U.S. 2,463,620, Heberlein; and U.S. 2,741,893, Vandamme et al.

Nylon filaments were the first thermoplastic textile materials capable of being heat-set and having adequate recovery from deformation so that bulky and stretch-type "Helanca" yarns could be prepared. The initial process developed to make such yarns was a batch-type operation in which a continuous yarn was highly twisted, a package of the twisted yarn was then heated under suitable conditions, and then the package was back-twisted to give a yarn that, on relaxation, coiled, curled, or crimped sufficiently to provide great bulk. In addition to the increased bulk, the yarn bundle had the elastic properties of a conventional spring without the helical regularity thereof.

The most time-consuming step in producing so-called "Helanca" or stretch-yarns is twisting. Mechanical twisters with rotating mechanical parts have severely limited rotative speed because of friction and the effect of centrifugal force on the rotating parts. The higest attainable speeds are of the order of 150,000 r.p.m. and this is for a false-twister which is more than nine times as fast as a standard commercial down-twister. Relative efficiency of specially designed false-twisting apparatus and continuous twisting process versus a conventional twister batch process is described in Fibres (Natural and Synthetic), vol. 16, August 1955, p. 276. As described therein, a 60-denier nylon yarn which is twisted 65 turns per inch, heat-set, and then back-twisted via the conventional twister route (12,000 r.p.m.) can be handled at the rate of 0.4 pound/spindle/week of 168 hours. A false-twister (32,000 r.p.m.) can produce this same stretch-yarn at the rate of 1.8 pounds/spindle/week (168 hours) or about 4.5 times faster than the batch operation. One reason why these older processes and false-twisting apparatus have not enjoyed extensive commercial success is their relatively slow speeds, low output and efficiencies, lack of product uniformity, and high maintenance costs which rendered the product very expensive.

One object of this invention is to provide an efficient high speed yarn-twisting process which utilizes a device containing no mechanical moving parts. Another object of this invention is to provide a yarn-twisting process capable of twisting yarn at a rate of over one million turns per minute. Another object of this invention is to provide a process for twisting yarns at higher speeds and at lower tension than has heretofore been utilized.

A further object of this invention is to provide a process for continuously crimping yarn at substantially higher speeds and lower yarn tension than heretofore possible. Another object of this invention is to provide a process for continuously and simultaneously twisting, plasticizing, deplasticizing, and backtwisting yarn at substantially greater yarn speeds, lower yarn tension, and higher twisting rates than has heretofore been possible.

A further object of this invention is to provide a process whereby freshly drawn yarn may be directly (prior to packaging) crimped by continuously and simultaneously twisting, plasticizing, deplasticizing, and backtwisting the yarn. Another object of this invention is to provide a yarn-twisting process whereby two ends of freshly drawn yarn (prior to packaging) may be directly crimped by continuously and simultaneously twisting one end in an S direction and the other in a Z direction, plasticizing, deplasticizing, and backtwisting each yarn end followed by plying the two ends together on the takeup package. Another object of this invention is to provide a process whereby a freshly extruded yarn (directly from the spinneret) is continuously and simultaneously twisted, plasticized, deplasticized, and backtwisted to produce a stretch-yarn.

It is a further object of this invention to provide a process whereby yarn may be cold-drawn and twisted in a continuous operation. Still another object of this invention is to provide a yarn-twisting process for producing stretch-yarns in which the yarn is twisted at tensions within a critical tension range and then immediately wound on a back-windable package.

According to this invention a high speed twisting motion is imparted to a filament, yarn, or other strand by torque applied to the strand by means of a high velocity stream of fluid, preferably air. For a uniform product, tension on the strand, upstream of the fluid stream applying said torque, must be less than about 60 grams.

In its simplest embodiment, the apparatus of this invention comprises, in combination, a fluid twister and means for passing yarn through the twister at controlled low tension less than about 60 grams. The fluid twister comprises a yarn passageway which is a smooth curved concave surface associated with one or more fluid conduits positioned to direct a stream of fluid circumferentially about the inner periphery of the concave surface. The yarn passageway may be integral with the fluid conduits, or the latter may be spaced apart from the yarn passageway but in position to direct fluid substantially tangentially to the inner periphery of the curved concave surface at some point. The axis of fluid flow (entering the yarn passageway) must not intersect the axis of the yarn passageway, but it may lie in a plane substantially perpendicular to the longitudinal axis of the concave surface, or in a plane inclined up to about 75 degrees or more from this perpendicular in order to exert forward movement or braking action upon the yarn in addition to twisting motion. There may be a plurality of conduits directing fluid flow about the periphery of the concave surface, and these conduits may be spaced longitudinally or circumferentially or both about the yarn passageway. Naturally, in order to obtain the highest degree of torque on the yarn, all of the fluid conduits, where there is a plurality should be directed in substantially the same tangential direction. It is not necessary, however, that the longitudinal axes of all the fluid conduits lie in the same or parallel planes with respect to the axis of the yarn passageway. One or more or a plurality of fluid conduits may have axes perpendicular to the axis of the yarn passageway while one or more others may have axes inclined to impart forwarding and twisting motion to the yarn while a lesser number of fluid conduits may have axes inclined backward toward the axis to partially inhibit the passage of the yarn therethrough. In the case where there are a plurality of fluid conduits supplying fluid to the yarn passageway, it may be desirable to provide one or more exit ports along the yarn passageway, and these may be positioned at any convenient points.

In the drawings, which illustrate specific embodiments of the invention,

Figure 1:
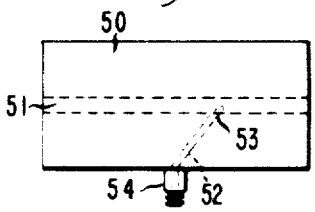
FIGURE 1 is an elevation of a simple embodiment of fluid twister, as viewed from a direction at right-angles to both the yarn passageway and the single fluid conduit.
Figure 2:
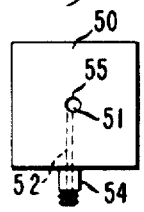
FIGURE 2 is an end view in the axial direction of the yarn passageway of the fluid twister of FIGURE 1.
Figure 5:
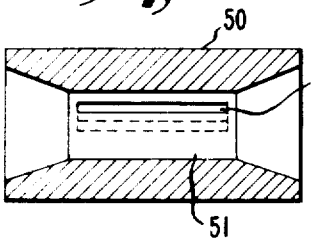
FIGURE 5 is a longitudinal cross-section taken along the axis of the yarn passageway (see line 5—5 in FIGURE 6) of a modified fluid twister having a slot-shaped fluid conduit.
Figure 6:
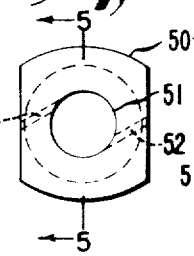
FIGURE 6 is an end view of the fluid twister of FIGURE 5.
Figure 7:
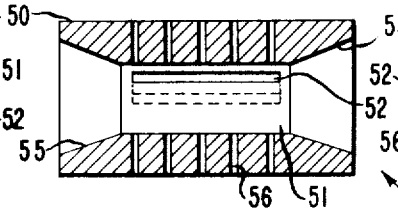
FIGURE 7 is a longitudinal cross-section, similar to that of FIGURE 5, of a fluid twister having a slot-shaped fluid conduit and a plurality of exhaust ports.
Figure 9:
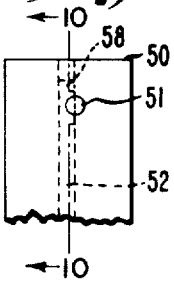
Figure 10:
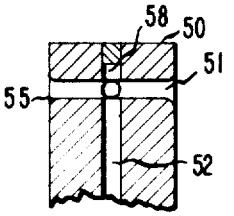
Figure 11:
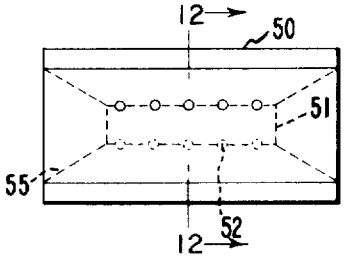
Figure 12:
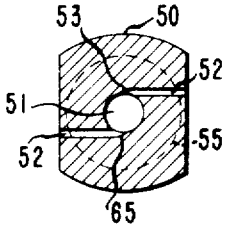
Figure 13:
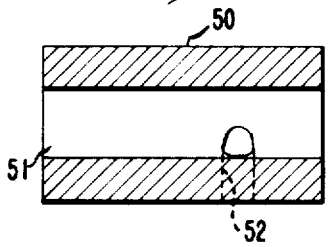
Figure 14:
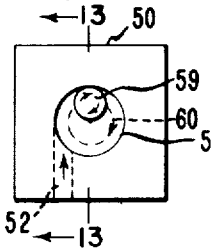
Figure 15:
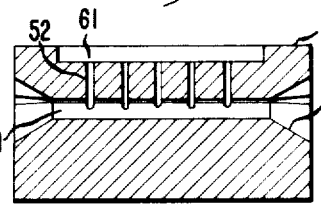
Figure 16:
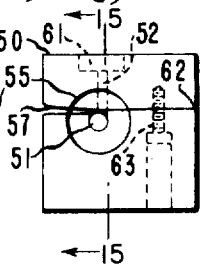
Figure 17:
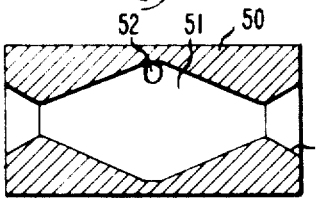
Figure 18:
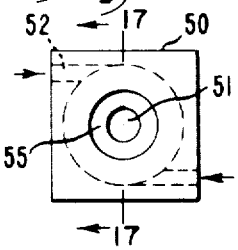
Figure 19:
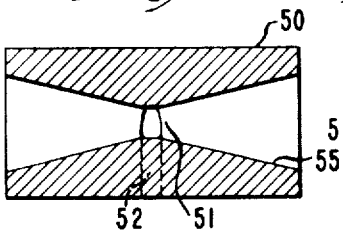
Figure 20:
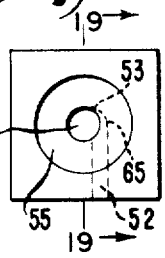
Figure 21:
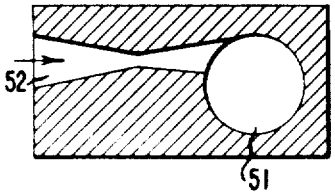
Figure 22:
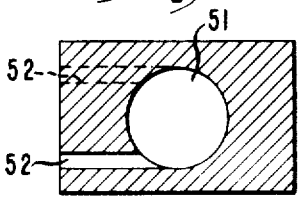
Figure 23:
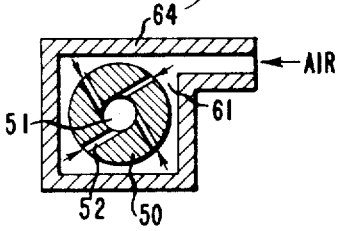
Figure 24:
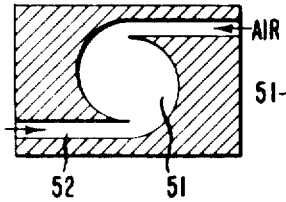
Figure 25:
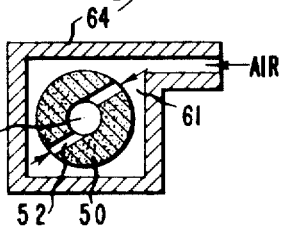
Figure 26:
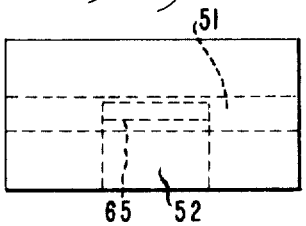
Figure 27:
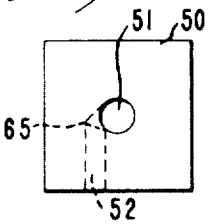
Figure 31:
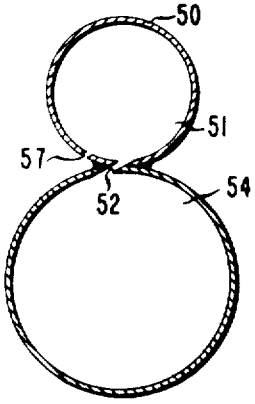
Figure 28:
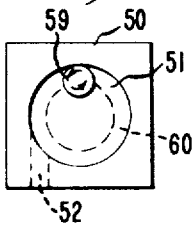
Figure 29:
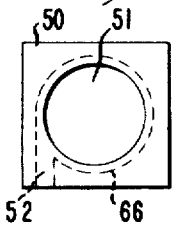
Figure 30:
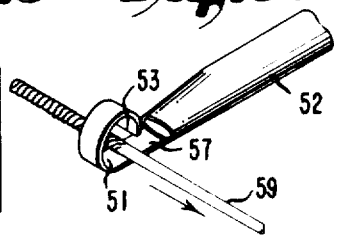
Figure 32:
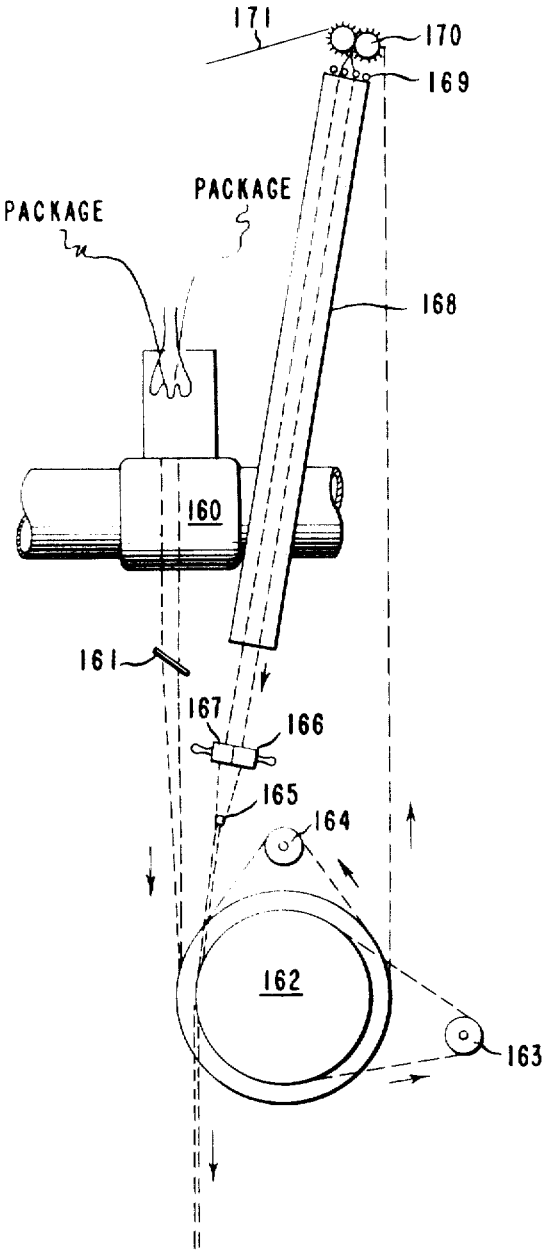
Figure 47:
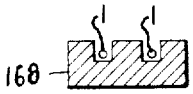
Figure 48:
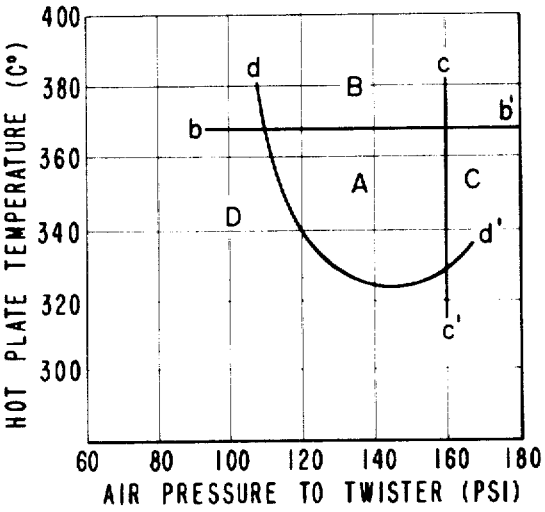
Figure 33:
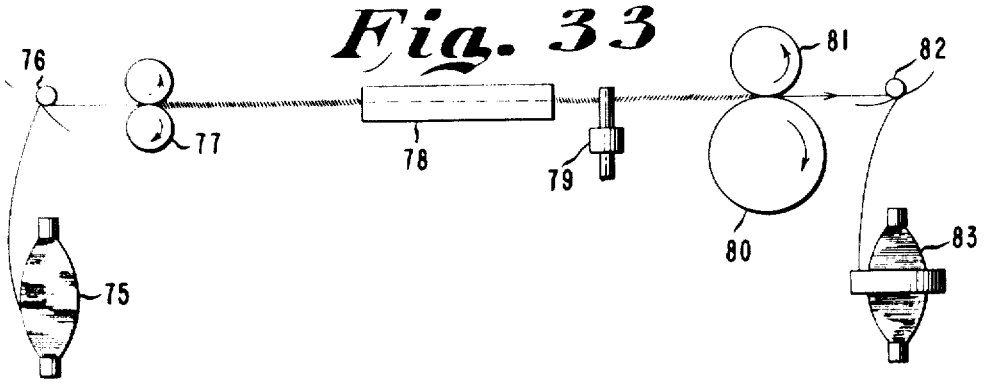
Figure 34:
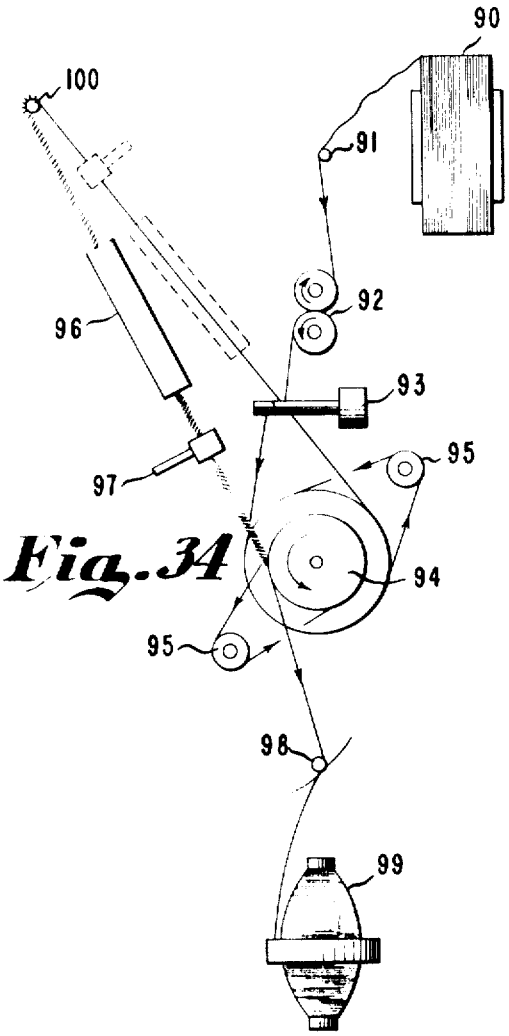
Figure 35:
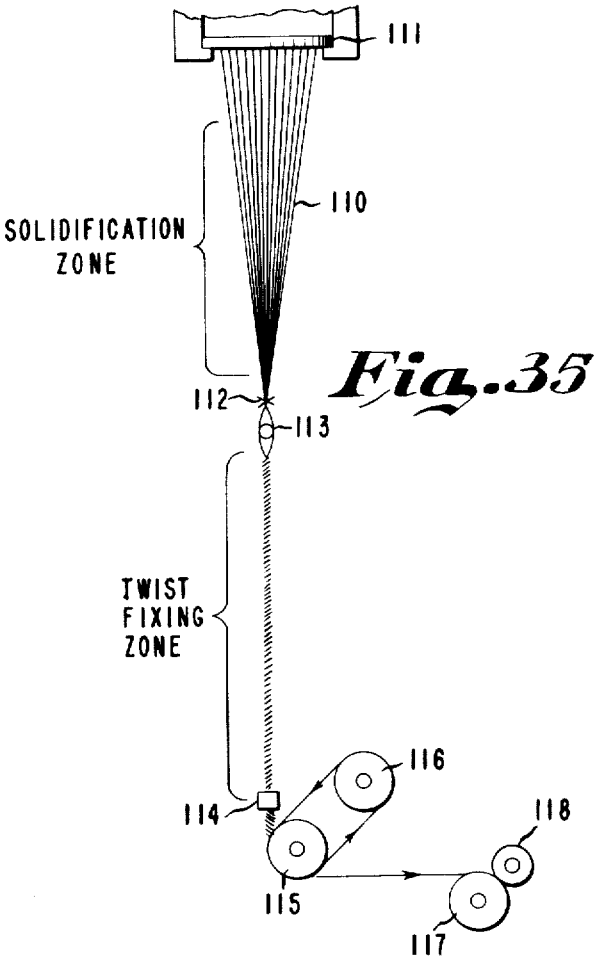
Figure 36:
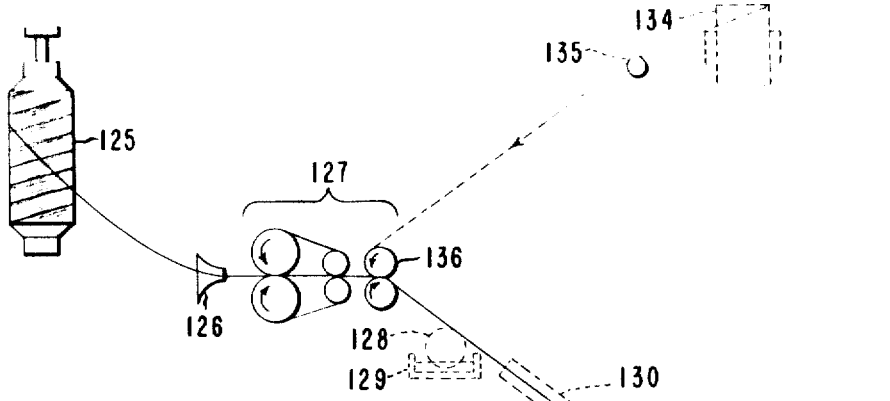
Figure 37:
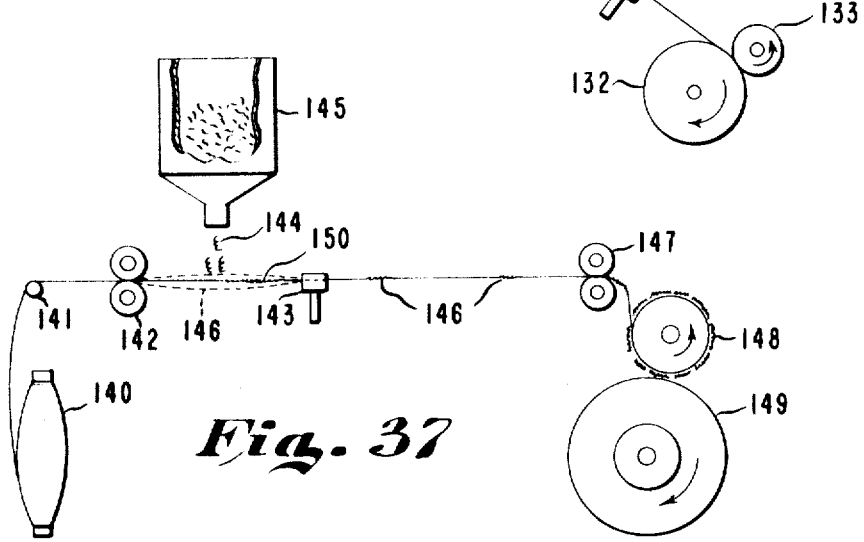
Figure 38:
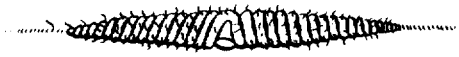
Figure 39:
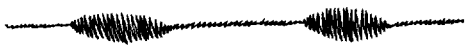
Figure 40:
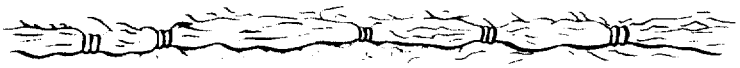
Figure 41:
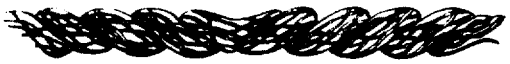
Figure 42:
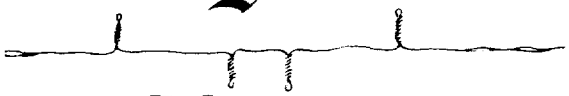
Figure 43:
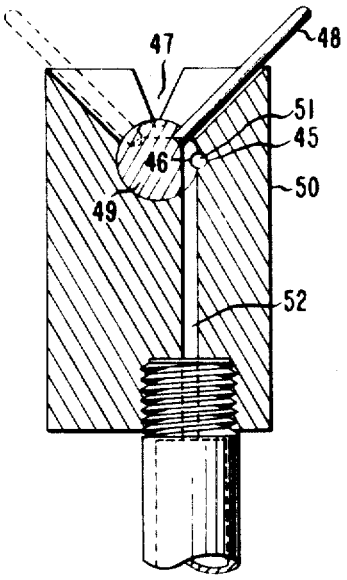
Figure 44:
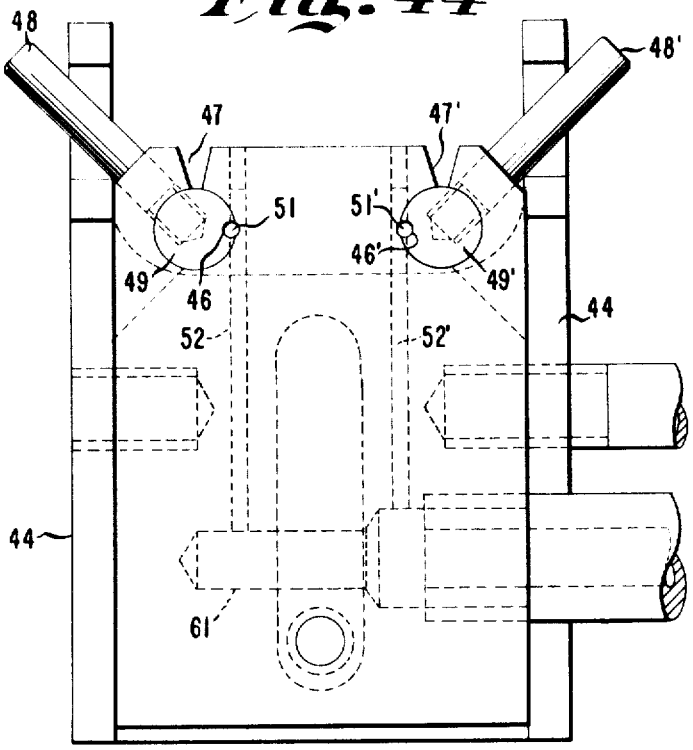
Figure 45:
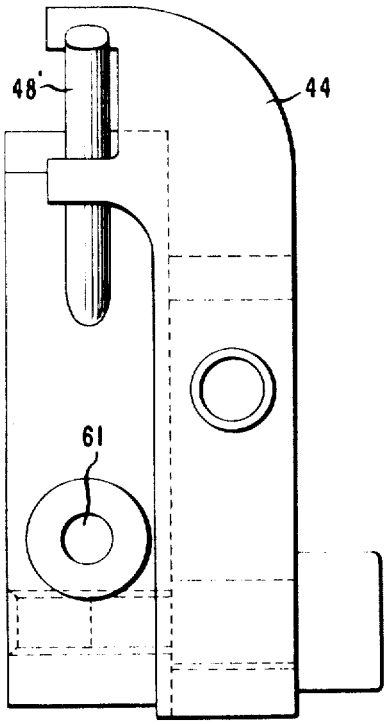
Figure 46:
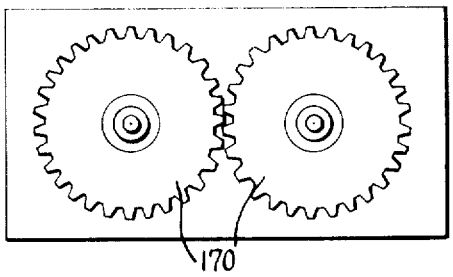

FIGURE 9 is an end view of a fluid twister similar to that shown in FIGURES 1 and 2 but modified by having the fluid conduit extended a short distance beyond the intersection with the yarn passageway, FIGURE 10 is a cross-section along line 10—10 of FIGURE 9, FIGURE 11 is an elevation of a fluid twister having a plurality of fluid conduits arranged in pairs entering the yarn passageway from opposite sides, the view being taken in a direction parallel to the axes of the fluid conduits, FIGURE 12 is a cross-sectional end view on line 12—12 of FIGURE 11, FIGURE 13 is a longitudinal cross-section of a fluid twister similar to that of FIGURE 1 but having a single cylindrically-shaped fluid conduit at right-angles to the yarn passageway, FIGURE 14 is an end view of the fluid twister of FIGURE 13 which also illustrates the motion of yarn in the yarn passageway during operation, FIGURE 15 is a longitudinal cross-section of a fluid twister having a plurality of fluid conduits extending into the yarn passageway from a manifold, FIGURE 16 is an end view of the fluid twister of FIGURE 15, FIGURE 17 is a longitudinal cross-section of a fluid twister similar to that of FIGURE 13 but having a yarn passageway which decreases in diameter in each direction, from the maximum diameter at the fluid conduit, to a minimum diameter near the entrance and exit ends of the yarn passageway, FIGURE 18 is a cross-sectional end view of the fluid twister of FIGURE 17, FIGURE 19 is a longitudinal cross-section of a fluid twister similar to that of FIGURE 13 but having a yarn passageway which decreases in diameter towards the point of entry of the fluid conduit, FIGURE 20 is an end view of the fluid twister of FIGURE 19, FIGURE 21 is a cross-sectional end view of a fluid twister similar to that of FIGURE 2 but having a venturi-shaped fluid conduit, FIGURE 22 is a cross-sectional end view of a fluid twister similar to that of FIGURES 13 and 14 but having an additional fluid conduit located so as to introduce fluid into the yarn passageway at a different point and in an opposing direction for the purpose of varying the rate of twisting of yarn as it passes through, FIGURE 23 is a cross-sectional end view of a fluid twister having fluid conduits entering the yarn passageway at four locations around the circumference, FIGURE 24 is a cross-sectional end view of a fluid twister having a pair of fluid conduits entering a non-cylindrical yarn passageway from opposite sides, FIGURE 25 is a cross-sectional end view of a fluid twister having fluid conduits of different diameters entering a cylindrical yarn passageway from opposite sides, FIGURE 26 is an elevation of a fluid twister similar to that of FIGURE 5 but the slot-shaped fluid conduit is arranged to impinge on a shoulder at the point of entry into the yarn passageway, FIGURE 27 is an end view of the fluid twister of FIGURE 26, FIGURE 28 is an end view similar to FIGURE 14 to further illustrate the motion of yarn in the yarn passageway, FIGURE 29 is an end view of a fluid twister similar to that of FIGURE 14 but having a yarn passageway which is somewhat larger in diameter at the point of fluid entry than at either yarn passageway port, FIGURE 30 is a perspective view of an extremely simple construction of fluid twister, FIGURE 31 is a cross-sectional end view of a modified form of the fluid twister of FIGURE 30, FIGURE 32 shows a string-up assembly whereby two yarns are simultaneously processed in a fluid jet using a step-down roll 162 which acts as a draw roll and also as a feed and take-up roll for the fluid jets 166, 167, FIGURE 33 shows a simple string-up assembly whereby a fluid jet 79 is utilized to impart twist to a yarn bundle and a heater 78 placed upstream of the twister plasticizes the yarn while in the twisted state, FIGURE 34 shows a string-up assembly similar to FIGURE 32 but utilized for processing a single strand, FIGURE 35 illustrates a procedure for utilizing a fluid twister 114 to twist a yarn bundle coming directly from a spinneret and prior to being drawn, FIGURE 36 shows an assembly utilizing a fluid twister to produce novel specialty yarns, FIGURE 37 shows an assembly specially adapted for producing slub yarns, FIGURE 38 is an enlarged illustration of the slubbed portion of the slub yarn of this invention, FIGURE 39 depicts a specific slub yarn of this invention, FIGURE 40 shows a sheaf-yarn disclosed herein, FIGURE 41 shows an alternate twist yarn produced by the processes of this invention, FIGURE 42 shows a branched slub yarn produced by a process of this invention, FIGURE 43 is a sectional end view of a novel fluid twister which can be strung up on the run, FIGURE 44 shows a fluid twister similar to FIGURE 43 but capable of handling two strands simultaneously, FIGURE 45 is a side view of FIGURE 44, FIGURE 46 is a detailed view of loosely-meshing gears 170 shown in FIGURE 32, FIGURE 47 is a cross-sectional view of the slotted hot-plate 168 in FIGURE 32, and FIGURE 48 is a graphical showing of critical operating conditions of the process of this invention.

FIGURES 1 through 31 illustrate the manner of interception of a yarn passageway 51 by one or more fluid conduits 52 and exhaust ports 56 and also show various forms which yarn passageway and fluid conduit may assume. It will be readily apparent that one or more of the cross-sectional or right-end views may be the cross-sectional or right-end views of one or more of the twister heads shown in longitudinal section or front elevation. Like numbers appearing in the various figures represent similar structures although the shape or form of the structure may vary from one figure to the next. For example, in each of the FIGURES 1 through 31 the yarn passageway is numbered 51 irrespective of whether the yarn passageway is cylindrical in form or a slot or a venturi or the like. Similarly, the fluid conduit is numbered 52 in each of the figures and so on.

FIGURE 1 illustrates a fluid twister useful in this invention. It has an axial yarn passageway 51 which, in this embodiment, is substantially cylindrical in form throughout its length. A conduit for fluid 52 intercepts the yarn passageway at 53 at an angle of about 60 degrees to the axis thereof and is positioned so that the longitudinal axis of the fluid conduit 52 does not intersect the longitudinal axis of yarn passageway 51, as shown in FIGURE 2. When gas under pressure is passed through fluid conduit 52 so that it reaches at least ½ sonic velocity upon emerging into the yarn passageway 51, sufficient torque upon any yarn in the yarn passageway is created to produce a high rate of twisting if the yarn is maintained at a tension less than about 60 grams. At relatively high fluid velocities less dense fluids may be employed to obtain substantially the same torque produced by a higher density fluid traveling at lower velocity. Fluid may be supplied to the fluid conduit 52 by any convenient means. As shown by FIGURES 1 and 2, fluid may be supplied by fitting 54, which is fastened over the fluid conduit exterior port and threaded for attachment to a fluid supply pipe. Preferably, the yarn passageway will have rounded edges at both ends to minimize tearing of the yarn bundle, and, in accordance with one embodiment shown in FIGURES 3 and 4, the yarn passageway is widened by bevels 55 at the yarn entrance and exit ports. Naturally, it is not necessary that these widened portions of the yarn passageway be symmetrical or even similar in shape.

Figure 3:
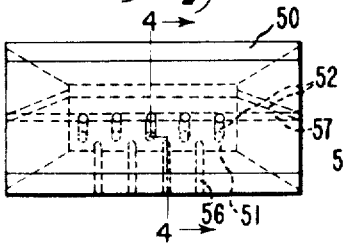
FIGURE 3 is an elevation of a more complex fluid twister having a plurality of fluid conduits and intermediate exhaust ports along the yarn passageway.
Figure 4:
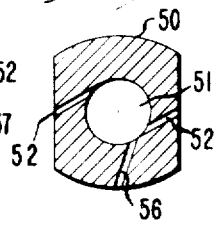
FIGURE 4 is a cross-sectional end view on line 4—4 of FIGURE 3.
Figure 8:
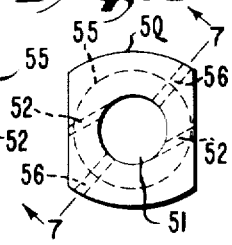
FIGURE 8 is an end view of the fluid twister of FIGURE 7.

When the yarn passageway is of substantial length, it is desirable that the yarn passageway contain one or more fluid exhaust ports 56, as illustrated in FIGURES 4 and 8, in order to facilitate removal of fluid from the yarn passageway. According to a particularly preferred embodiment, the fluid twister may be designed to provide for ease in stringing-up a threadline by providing a string-up slot running the entire length of the yarn passageway. The string-up slot may simultaneously serve as an air conduit or exhaust port, as desired. FIGURE 3 illustrates one possible form of string-up slot 57. FIGURES 9 and 10 illustrate one manner of providing a fluid entry into the yarn passageway whereby the fluid will be cushioned against itself at the point of entry into the yarn passageway and thereby make a very smooth entry possible. This result is obtained, as shown in FIGURES 9 and 10, by designing the fluid twister so that the fluid conduit extends beyond the yarn passageway to form a fluid conduit extension 58. In the case of twisters containing a multiplicity of fluid conduits, it is convenient to design the twister in a manner to provide a manifold region 61 (FIGURE 15) to facilitate maintenance of air at constant pressure to all fluid conduits where that is desired. FIGURE 16 illustrates a particular embodiment of fluid twister containing a string-up slit 57. The twister of FIGURE 16 is divided in two sections, as shown, to further facilitate string-up, the two sections being held together by bolt 63. If desired, the sections may be hinged at 62. In FIGURES 23 and 25 there is provided a manifold housing 64 suitable for surrounding the entire twister head with fluid, and the twister head in these embodiments is porous to permit the transmission of fluid therethrough at a slow rate to reduce yarn-to-wall friction. FIGURE 27 illustrates a twister in which the fluid conduit 52 has a shoulder 65, and FIGURE 29 illustrates a twister in which the yarn passageway is somewhat wider at the point of fluid entry than at either yarn passageway port.

FIGURE 43 illustrates a fluid twister particularly useful in this invention in being particularly adapted for ease of string-up. In this twister, yarn passageway 51, substantially cylindrical in form throughout its length, is intercepted by fluid inlet 52, the latter being positioned so that the longitudinal axis of the fluid inlet does not intersect the longitudinal axis of the yarn passageway. Yarn passageway 51 has its walls formed partly by a recess 45 in the body of twister 50 and partly by recess 46 in a close fitting movable cylinder 49 positioned within the twister, the axis of the cylinder being parallel to the axis of the yarn passageway. By rotating cylinder 49 as with handle 48, recess 46 can be brought into communication with V groove 47 for string-up purposes. By passing a yarn through the V groove and into recess 46, then rotating cylinder 49 until recesses 45 and 46 are aligned, the twister is made ready for operation. It is not necessary that the walls of yarn passageway 51 be evenly distributed between cylinder 49 and body 50. It is only necessary that the recess 46 be capable of receiving a yarn through V groove 47 and be large enough so that cylinder 49 can rotate within body 50 without snagging or abrading the yarn unduly.

The twister of FIGURE 44 is similar to that of FIGURE 43 but is capable of handling two strands simultaneously while providing for constant fluid pressure on each of the strands and also adapted so that treatment can be started and stopped precisely at the same instant. The simultaneous functioning of the two fluid twisters is achieved by actuating handles 48 and 48' simultaneously by movement of yoke 44. A downward movement of the yoke brings both recesses 46 and 46' into communication with V grooves 47 and 47' for introduction of the respective yarns to be treated. An upward movement of the yoke rotates cylinders 49 and 49' until yarn passageways 51 and 51' are simultaneously formed. Fluid pressure entering yarn passageway 51 from manifold 61 through fluid inlets 52 and 52' instantly acts upon each of the threadlines simultaneously. Processing of both threadlines is simultaneously terminated by lowering yoke 44.

FIGURE 45 is a side view of the dual twister of FIGURE 44.

FIGURE 48 is a graph showing preferred operating conditions of this invention in terms of air pressure applied to a fluid twister and hot plate temperature, in the situation where the process is utilized to produce a stretch type yarn. The preferred operating zone labeled A in the graph is bounded by the line b–b′ which falls at about 370° C. Above this temperature, yarn products appear excessively weakened or in severe cases actually fused. The area C to the right of the line c–c′ indicates conditions where tension variations in the yarn become progressively severe, this being believed to be associated with a twist doubling phenomena. The curved line d–d′ excludes area D which represents conditions tending to produce yarn products having either insufficient stretch or excessive loss of stretch properties on prolonged storage. Experimental work performed in preparing this graph maintained all factors constant except the variables indicated. Overfeed was maintained at 15% and yarn tension remained relatively constant at approximately 3 grams. The yarn was poly(hexamethylene adipamide).

The yarn passageway of the fluid twister of this invention preferably has an internal diameter (in the case where the yarn passageway is cylindrical) of between about 0.002 inch and about 0.125 inch and preferably between 0.015 and 0.040 inch. Yarn passageways which are not cylindrical will preferably have cross-sectional areas at the initial point of contact between the yarn and stream of fluid corresponding to areas of circles having these diameters. The ratio of yarn hole diameter to the yarn diameter should be in the range of 2–10 and preferably 3–6. For fluid twisters of this invention having yarn passageways with cross-sectional areas comparable to a circle having a diameter up to about 0.125 inch, the direction of rotation of the yarn bundle during twisting is in the direction of fluid flow about the inner periphery of the yarn passageway, and this direction of rotation will be referred to herein as "direct twisting." With yarn passageways having cross-sectional areas comparable to a circle with a diameter of more than about 0.125 inch, centrifugal thrust forces the yarn bundle to roll on the inner periphery of the yarn passageway in a motion analogous to that of a planetary gear. This twisting action is referred to herein as "reverse twisting," and it will be apparent that with "reverse twisting" the twist imparted to the yarn is opposite to the twist obtained by "direct twisting," even though in each instance the direction of fluid flow about the yarn passageway is the same.

It is an important feature of this invention that during the twisting of the yarn bundle, whether the twisting action is "direct twisting" or "reverse twisting," the longitudinal axis of the yarn describes a surface similar to the inner surface of the yarn passageway and spaced from the inner surface of the yarn passageway by a distance equal to about the radius of the yarn bundle. This feature of the instant invention is illustrated in FIGURES 14 and 28. FIGURE 14 illustrates direct twisting of a yarn bundle 59 in yarn passageway 51 and shows, by arrows, that the yarn twists about its axis in the same direction as fluid flow about the inner periphery of the yarn passageway while the axis of the yarn bundle describes a surface spaced from the inner surface of the yarn passageway by a distance at least the radius of the yarn bundle, both surfaces having a common longitudinal axis. FIGURE 28 illustrates the motion of a yarn bundle 59 subjected to reverse twist action showing that the yarn bundle rotates about its axis in a direction opposite to the flow of fluid about the inner periphery of the yarn passageway while the axis of the yarn bundle moving in the same direction as the flow of fluid about the passageway describes a surface spaced from the inner surface of the yarn passageway by a distance equal to the radius of the yarn bundle, both of said surfaces having a common longitudinal axis.

Some prior attempts to rotate yarn by means of fluid flow have been characterized by endeavors to rotate the yarn about its own stationary axis by the turbine action of a fluid vortex. Yarn tensions have been maintained sufficiently high so that the yarn was maintained rigid, thereby preventing displacement of the yarn from the center of the yarn passageway despite eccentric fluid forces acting on the yarn periphery. Low torque was imparted to the yarn because of the short lever arm through which the tangential forces must act due to the small diameter of the yarn.

In another species of fluid twister such as disclosed in U.S. 2,515,299 to Foster et al., yarn is passed at substantially no tension through an enlarged chamber filled with revolving air and the yarn balloons within the chamber to provide an annular reach which is revolved in the manner of a mechanical twister. Because of the enlarged chamber, excessively low tension on the threadline and the distortion of the threadline, throughput rate is low. Consequently, as disclosed in this patent, such a false-twister is suitable for low rates of twist of heavy threadline (e.g., staple roving).

When operating in accordance with this invention, however, ballooning of the yarn, to the extent that it occurs, is greatest outside the fluid twister and the yarn undergoes a twisting action as above described at tensions below 60 grams. Ballooning of the strand within the twister is not discernible. High twist is thus obtained, and yarns having more than 50 turns per inch are readily obtained at twisting rates substantially higher than one million turns per minute when the path of yarn rotation is confined within a yarn passageway of small diameter, that is, less than about 0.06 inch, or in larger diameter passageways where reverse twist occurs by the yarn rolling on the inside of the passageway wall. For direct twisting, the rate of yarn twisting is about equal to the rate at which the yarn bundle rotates around the axis of the yarn passageway. For reverse twisting, the rate of twisting may exceed this rotation rate since the yarn may roll about its own axis many times in making one turn about the axis of the yarn passageway. Fluid twisters of this invention having a yarn passageway diameter of about 0.125 inch may be operated with direct twisting or reverse twisting by adjusting yarn tension, alignment of the yarn passageway, feed rate of yarn supply, or the like. The term "yarn" as used herein is representative of any strand material in the form of a monofilament, multifilament or spun staple yarn or film strips.

The cross-sectional area of the yarn passageway in the fluid jet device of this invention is preferably about equal to that of the fluid inlet conduit at the point of interception. Fluid jet devices in which the ratio of the cross-sectional area of the yarn passageway to the cross-sectional area of the fluid inlet orifice at the point of interception varying from about 4:1 to about 1:10 may be used, however, Preferably, the yarn passageway and the fluid passageway are cylindrical in shape but either or both may be other than circular in cross section and neither need be uniform in area or cross-sectional form throughout its length. The figures illustrate various fluid jet devices of this invention, but it will be apparent that the figures are illustrative only, and many variations of the fluid twisters shown in the figures will be readily apparent.

The length of the yarn passageway may be widely varied. A very efficient fluid jet device is one having a yarn passageway length between about 0.125 and about 0.5 inch and having only one fluid inlet port. The length of the yarn passageway should not be less than its diameter (or its substantial equivalent where the passageway is not circular in cross section). Preferably, the yarn passageway will be about 10 times its diameter and desirably will not be more than 25 times its diameter. Longer yarn passageways may be utilized and are very efficient when "reverse twisting action" is employed. In the case of fluid jet devices having relatively long yarn passageways, it is often desirable to utilize a plurality of fluid supply conduits and one or more exhaust ports connected to the atmosphere or to a reduced pressure source to facilitate escape of the driving fluid and minimize back pressures. With short yarn passageways, exhausting of fluid is no problem since the fluid passes directly through the open ends of the yarn passageways. It may be desirable to have some fluid supply conduits angled forward to impart forward motion to the yarn while others exert rotative thrust. Obviously, this effect can also be achieved with a fluid twister having a longer yarn passageway and a plurality of fluid inlet ports.

Pneumatic twisters with yarn tubes of very small diameter show surprisingly high efficiency in terms of air consumption vs. useful work produced. This is an important consideration since air consumption is directly related to cost of manufacturing. Fluid yarn twisters of this invention appear to operate at highest efficiencies when the yarn tube is about the same in diameter as the individual air inlet tubes. In a preferred embodiment, the air inlet tube axis is off-center with respect to the yarn tube axis by approximately the dimension of the air tube radius, and the yarn tube length is between about two and about fifteen times the yarn tube diameter in order that motivating air may exhaust freely. With this arrangement, exhaust air is skewed with respect to the yarn tube axis, thereby tending to promote instability of processing particularly when tension on the yarn is very low. Careful adjustment of the yarn axis positions entering and leaving the fluid twister to coincide with the axis of air exhaust flow provides substantially much more stable and uniform operation and with fluid twisters, which are capable of such high rates of twisting as compared to mechanical twisting devices, stability of operation and uniformity of product are to be preferred over optimum efficiency.

Air at room temperature is preferred for twisting yarn in the fluid jet device of this invention but the air may be heated or refrigerated, if desired. Steam or solvogenic gases may also be used provided that the plasticizing action, if any, is not harmful. For certain twisting applications it may be desirable to utilize a fluid with a plasticizing effect. Other gases, such as carbon dioxide, nitrogen, and the like, may be utilized, if desirable. In order to operate the process in accordance with the invention, it is necessary that the fluid, when a gas, be at a velocity of ½ sonic velocity or more immediately prior to impinging upon the yarn, to effect the high twisting rates of this invention. Non-gaseous fluids should reach velocities sufficient to do comparable twisting. Such fluids, of course, do not have to reach the same velocities because of their higher densities. By increasing the velocity of the fluid flow on the yarn, twisting speeds in excess of this amount are obtained.

For the production of uniform stretch yarns, it is an important part of this invention that the tension on the yarn being twisted (measured adjacent to and upstream of twister) be maintained above the critical tension ($T_c$) which is the tension at which twist-doubling occurs. Where a high degree of twist is desired at a high throughput rate, preferred tension limits are between about 3 grams and 15 grams. Tension on the yarn downstream of the twister may be somewhat different (higher or lower) than that on the yarn upstream of the twister.

For certain very high yarn speeds, i.e., 1,000–2,000 y.p.m. and up and for heavier deniers, i.e., 100–500 denier or larger, it is possible to use very low tensions. The lowest operable tension if a uniform product is desired is a tension just great enough to prevent twist-doubling, that is, second or third order twist. Operating at such very low tensions results in a non-steady state condition and can be useful for novelty or intermittent effects but not for the production of a uniform stretch yarn. Tensions above 60 grams are also useful up to the point at which yarn damage occurs but are not useful for preparing a high grade stretch yarn. The utility of this process in other applications to include lower twisting rates and higher tension conditions is more completely described in copending application Serial No. 754,912, filed August 12, 1958, Breen and Sussman, and now abandoned.

The high speed yarn-twisting process of this invention may be utilized very effectively and efficiently to produce so-called "Helanca" or stretch-type yarn at exceedingly high rates of production. Apparatus incorporating a fluid twister of this invention and adapted to produce stretch-type yarn at high rates of yarn through-put is shown in FIGURE 33. In this apparatus, a textile denier yarn of less than about 2,000 denier is taken from supply package 75, passed through pigtail 76 thruogh feed rolls 77, and plasticized by passing over hot plate 78 before entering fluid twister 79 and take-up rolls 80, 81. Tension upstream of the twister is maintained below 15 grams by regulating the relative speeds of the feed and take-up rolls. A tension gate may be used in place of feed rolls 77 but is much less desirable because of the non-uniform product produced and increased difficulties in control. Upon entering the fluid twister, the yarn is continuously subjected to a high rate of false-twisting. This twist extends backward along the yarn to the feed roll 77. The yarn in this twisted state, upon passing over the hot plate, is plasticized in the twisted condition. The heat plasticized twisted yarn, upon leaving the presence of the hot plate and coming into contact with exhaust fluid leaving the yarn entrance port of the fluid twister, is quenched (deplasticized) prior to entering the fluid twister. In order that the fluid twister provide this quenching effect on the heated twisted yarn, it is important that the temperature of the exhaust fluids from the fluid twister be maintained at a temperature 50° C. below the plasticized yarn temperature, preferably 100° C. below and ideally 150° C. or more below the heat plasticized yarn temperature. Due to the false-twisting action of the fluid twister, the deplasticized twisted yarn, immediately upon passing the point of greatest torque in the fluid twister, is back-twisted to substantially its original state of twist, thereby producing a sretch-type yarn which is passed through nip rolls 80 and 81, over pin 82, and taken up as a back-windable package 83 preparatory to use.

In place of the hot plate of FIGURE 33, any suitable heating means, such as a hot pin, infra-red light, steam tube or cell, hot water, and the like, may be employed. Plasticizing the yarn may also be achieved in the absence of heat as, for example, with solutions of chemical plasticizing agents or similar materials. Steam or other plasticizing material used to treat the yarn can be applied by use of a torque or texturing jet similar to those described herein and also in U.S. 2,783,609.

When plasticizing is effected with heat, the temperature of the heating medium must be regulated so that the average yarn temperature does not reach the melting point of the yarn material. The heating medium temperature or source of heat may be above the melting point of the yarn and the surface of the yarn may be above its melting point so long as yarn speeds are such that average yarn temperature (over a cross-sectional area of yarn) is maintained below the yarn melting point. Temperatures lower than the second-order transition temperature of the yarn material are usually not employed because, under these conditions, any crimping of the filaments is not permanent and utility of the product is reduced. The preferred temperature is that which results in plasticization without fusing or degradation.

At high yarn speeds high temperature and/or longer exposure distances are necessary to provide temperatures at the desired plasticizing level. These higher yarn temperatures may be achieved by means of an auxiliary heating device or pre-heater in the threadline, but a simple means for achieving this same effect is to have the yarn pass twice over a single heated plate so that yarn is preheated as it passes up along one face of the hot plate to a snubbing point and then is plasticized as the yarn progresses down across the reverse face of the hot plate to a fluid twister.

To produce highest quality stretch-yarns in accordance with this invention, that is, to achieve maximum bulking or crimping, it is essential that the tension on the yarn adjacent to and upstream of the twister be maintained below about 15 grams. Tension may be controlled by a tension gate or other suitable means but these are difficult to control and produce non-uniform products. Preferably, tension is controlled directly by regulating the relative speeds of the feed rolls and windup rolls. The yarn speed differential between feed and windup rolls will be governed by the degree of bulking desired as well as the relative operating speed of the process, that is, throughput of yarn in yards per minute. Yarn speed differential between input and output with respect to the fluid twister may vary between about 5% to about 50%, and yarn speed through the fluid twister may vary from 50 to about 1,000 yards per minute or higher. For economical operation, yarn speed will ordinarily be at least about 100 yards per minute and preferably at least about 400 yards per minute. Because yarn tension is controlled directly by the speeds of the feed and windup rolls, tension upstream of the twister is easily maintained constant below 15 grams while tension downstream of the twister is also maintained constant.

It is essential, in operating the process of this invention to produce a useful bulked yarn or stretch-type yarn, that back-twisted yarn leaving the fluid twister be taken up on a package suitable for backwindings. Substantial yarn tension must be employed downstream of the windup rolls during the windup, and preferably the yarn tension at windup is in accordance with standard windup practices in the art. Windup yarn tensions will ordinarily be substantially greater than the upstream twisting tensions utilized and should be sufficient to produce a good back-windable package of yarn.

Air velocity in the fluid twister must be maintained constant and within critical limits if a uniform stretch yarn is desired. A minimum air velocity of at least ½ sonic velocity is essential, and it is also extremely important that the air velocity in the fluid twister (immediately prior to impinging upon the yarn as mentioned above) not exceed that which causes the yarn to undergo twist doubling (e.g., second-order twist) in which the twisted yarn twists upon itself.

The process of this invention is useful for treating any natural of synthetic filamentary material, particularly filaments of polyamides, polyesters, and polymers of acrylonitrile. Suitable polymers can be found among the fiber-forming polyamides and polyesters which are described in U.S. Patents 2,071,250; 2,071,253; 2,130,523; 2,130,-948; 2,190,770; and 2,465,319. The preferred group of polyamides comprises such polymers as poly(hexamethylene adipamide), poly(hexamethylene sebacamide), poly (epsilon caproamide), and the copolymers thereof. Among the polyesters that may be mentioned, besides poly(ethylene terephthalate), are the corresponding copolymers containing sebacic acid, adipic acid, isophthalic acid as well as the polyesters containing recurring units derived from glycols with more than two carbons in the chain, e.g., diethylene glycol, butylene glycol, decamethylene glycol and trans - bis - 1,4 - (hydroxymethyl) cyclohexane. Non-thermoplastic materials, such as the natural fibers—wool, silk, cotton, the synthetic protein fibers, regenerated cellulose and the like—can also be highly crimped or bulked although they are not as elastic as the thermoplastic fibers. Both types of materials can be made into elastic fabrics having improved bulk, covering power (opacity) and hand. This process is useful for both staple and continuous filament yarns of all types having deniers less than about 2,000 and preferably less than about 800, and is useful for staple yarns since it permits false-twisting of staple yarns and back-twisting of single staple yarns through the zero-twist point—feats not heretofore possible.

The process of this invention is preferably carried out on a continuous filament yarn immediately after the process of cold-drawing. An economic procedure involves incorporating a fluid twister along a threadline immediately after cold-drawing and prior to standard tension yarn takeup as shown in FIGURE 34. It is obvious, however, that the process can be carried out as a separate operation, either prior to or after drawing or after some indeterminate storage period.

Since retraction of stretch-yarns in the presence of steam is a measure of wet recovery properties and varies directly with the degree of stretchiness, the quality of stretch-yarns can be graded on the basis of percent retraction, using the following formulation:

$$\text{Retraction (percent)} = \left\{\frac{\text{skein length before steaming} - \text{skein length after steaming}}{\text{skein length after steaming}}\right\} \times 100$$

To determine percentage of retraction of a skein of yarn, the skein is wound at substantially zero tension on a reel with a periphery of 112 cm. to give a total denier of 1400. It is then suspended in front of a suitable scale and loaded with a weight of 1.82 grams to give 0.0013 g.p.d. A static eliminator is passed along the yarn bundle to prevent ballooning of the filaments, if necessary. Atmospheric pressure steam is directed on the suspended yarn bundle for about five seconds. High quality continuous filament nylon stretch yarns ordinarily have retraction values calculated in accordance with the above equation of the order of 85% to 560%. Such a shrinkage range is achieved with thermoplastic continuous filament yarns. Lower retraction values of such yarns are useful if increased bulk with some stretchiness is adequate for the end use at hand. Such lower value will also result if the yarns being treated are not thermoplastic and/or are made from staple fibers.

The permanence of the stretch properties of the yarn may be adversely affected by prolonged storage in a hard packaged condition. This is simply a stress decay phenomenon which may be accelerated by plasticizing during storage. In the case of nylon, the plasticizing action of excess humidity is particularly undesirable since this condition is frequently found in storage areas. For example, fresh prepared yarn produced as in Example 65 and having a steam retraction value of 120%, after storage for four days, while protected with a polyethylene moistureproof bag, exhibits a steam retraction of 105%. The same yarn after storage at a relative humidity of 60% with no protection for a similar period of time has a steam retraction value of only 85%. The same unprotected yarn stored at 100% relative humidity reduced the yarn steam retraction value to 23% and the resulting yarn, while bulky, had lost most of its initial stretch properties. The same yarn stored in a dry box at 0% relative humidity showed no appreciable loss of stretch properties over a period of twenty days.

Yarns of polymers which do not absorb much moisture from the atmosphere or which resist the plasticizing action of moisture exhibit little sensitivity to stress decay in storage. Yarns produced as in Examples 80 through 88 from polyethylene terephthalate and those in Examples 89 and 90 are particularly insensitive to stress decay and are preferred for end uses where stress decay on exposure to plasticizing conditions is a particular problem, e.g., bathing suits.

In the production of uniform stretch-yarn, it is undesirable to package a twisted portion of yarn which has resisted the jet untwisting action. These so-called "hard spots" can be produced by fluctuations in tension or twisting action of the jet, twist snubbing variations and/or differences in the degree of yarn setting. Excessive temperature in the setting zone and heavy non-uniform finish deposits also tend to produce "hard spots" in the yarn by fusing the surface filaments together so that they tend to resist untwisting to a much greater extent than unfused filaments. By "twist snubbing" is meant snubbing a twisted yarn in a manner to prevent the twist from passing the snubbing point.

Constant downstream twist snubbing is desirable to produce uniform stretch or bulk yarn. Torsional slippage of an irregular character at the downstream snubbing point allows some sections of yarn to escape the jet untwisting action to some extent, producing variable bulkiness or in severe cases "hard spots" previously mentioned.

A suitable yarn finish to control static, friction, and yarn running properties is desirable. The finish may also serve to improve heat transfer among the filaments increasing the rate and/or the degree of setting. For a uniform product it is desirable that the finish be applied uniformly.

FIGURE 34 illustrates a preferred string-up assembly whereby a fluid twister of this invention may be utilized to impart twist to a yarn bundle immediately after drawing the yarn and prior to packaging the drawn yarn. In accordance with this embodiment, undrawn yarn is taken from a package 90, passed over pin 91, through nip rolls 92, and then turned about draw pin 93 before passing around the larger circumference of a step-down roll 94 which draws the yarn. Conventional canted separator rolls 95 are used in conjunction with the step-down roll. The yarn is then passed through twist snubbing guide 100, through plasticizing zone (preferably heated) 96 prior to entering fluid twister 97. Tension on the yarn upstream of the twister is maintained below 15 grams by means of step-down roll 94. Yarn coming from the fluid twister 97 is passed around the smaller circumference of the step-down roll 94, whereas yarn feeding the fluid twister must first pass around the larger circumference of the step-down roll. Thus, the yarn feeding to the fluid twister is traveling at a greater speed than the yarn leaving the fluid twister by an amount predetermined by the diameters of the larger and smaller sections of the step-down roll 94. After leaving the step-down roll, the yarn is passed through pigtail 98 and wound up as backwindable package 99 at standard tension. In FIGURE 34, as just described, the yarn is plasticized and twisted priort to changing direction at guide 100. Alternatively, the plasticizer and twister may be placed after guide 100 as shown in dotted lines but in this string-up yarn has a shorter path of travel between step-down roll 94 and the plasticizing zone. The former arangement of heater and twister on the down leg of the yarn permits insertion of supplementary heaters along the yarn path between the large section of roll 94 and guide 100.

At 170 in FIGURE 32 and in greater detail in FIGURE 46 there is shown a species of upstream twist snubbing guide. A snubbing guide in the process for producing stretch-yarn should ideally provide a positive grip on the threadline to prevent twist leakage upstream of this point. The usual pinch rolls provide this action very effectively. Such rolls are not convenient, however, in the usual draw-twisting operation because they tend to make yarn wraps difficult to remove. Pairs or rolls mounted cantilever fashion with a small angle between their axes for wrap separation are preferred. Several wraps are generally necessary to provide sufficient friction for yarn speed and tension control. This type of system is less effective as a twist snubbing device since the twist is reduced gradually in its passage upstream of the first contact point rather than abruptly as in the case of the pinch roll. The twist snubbing in this case also applies a force to the threadline tending to displace it along the roll axis, and in a direction depending on the direction of twist. In effect, the yarn tends to roll or "walk" across the face of the contacting surface under the influence of the twisting force. This interferes with proper wrap separation and tends to introduce non-uniformities by fluctuations in yarn-to-roll friction which cause the snubbing action to vary. An auxiliary step on the step-down roll will control this "walking." The last wrap of yarn about the feed roll prior to the yarns entering the heater is taken about this step, and the twist direction is arranged so that the torque causes the yarn to move toward the face above the step. This face prevents the displacement of the last wrap which snubs the twist sufficiently to eliminate the problem of wrap separation in the remaining wraps.

The loosely meshing gears 170 shown in FIGURE 32 and in greater detail in FIGURE 46, provide a preferred method of "twist snubbing." This arrangement has the advantage that it can apply the twist snubbing action to a number of threadlines simultaneously regardless of twist direction. For simplicity, it is preferred that these gears are driven by the yarn itself although any suitably auxiliary driving arrangement may be employed. A simple pulley or belt driven by the yarn feed roll provides a reliable drive and is particularly useful for very lightweight yarns. Another simple means is to impinge an air jet 171 on the gears to drive them. Exhaust air from the fluid jets can be used for this purpose. Other arrangements may be used to grip the moving threadline either intermittently or continuously so as to snub the twist at a substantially fixed point. Those systems which impose little tension change on the moving threadline and cause a minimum of tension fluctuations are preferred for the purposes of this invention.

It is important that the yarn in the zone between the fluid vortex and the upstream snubbing point should have minimum fractional contact with plasticizing devices such as hot plates, and the like. In any practical process, this requires careful alignment of the jet, the hot plate slot, and the upstream snubbing guides.

In a specific illustration of the operation of the string-up of FIGURE 34, undrawn poly(hexamethylene adipamide) yarn is taken directly from the spin bobbin, passed over a feed roll with a surface speed of 133 yards per minute, over a draw pin, and around a draw roll, with a surface speed of 440 yards per minute. The yarn is drawn 3.3 times due to the difference in speed between the feed roll and the draw roll. The yarn makes three turns around a separator roll and the draw roll and then passes over a twist-snubbing guide, over a hot plate, through a pneumatic twister, and back to a small diameter roll which is mounted concentrically and on a common shaft with the draw roll. This latter small roll has a surface speed which is 15% less than the draw roll. The yarn passes twice around this smaller roll and its separator roll. The smaller roll and separator roll can be considered as a windup roll. The difference in diameter or surface speed of the small and large concentric rolls determines the overfeed to the pneumatic twisting process and hence determines the tension in the processing zone. From the windup roll, the yarn travels to a standard pirn windup. The product produced is a 70–34 stretch nylon.

The yarn path between the draw roll and the windup roll can be considered as the stretch processing zone. The hot plate 96 and twister 97 can be mounted as shown in FIGURE 34 in which case the processing is designated as "down" processing. Alternatively, the twister and hot plate can be mounted as shown by the dotted outline in FIGURE 34 in which case the processing is designated as "down" processing. Alternatively, the twister and hot plate can be mounted as shown by the dotted outline in FIGURE 34 in which case the twisting process is designated as "up" processing. For high speed operation, the "down" processing procedure is preferred since an additional hot plate can be mounted on the up traveling leg of the processing zone which will supplement the heating effect of the hot plate immediately upstream of the pneumatic twister.

FIGURE 32 shows a version of the process of FIGURE 34, Two threads are run simultaneously on each position and drawn to the large diameter portion of stepped roll 162 and about separator roll 164. The yarns then pass up to the nylon gears 170 which act as twist snubbers and thence they are separated by the guide pins 169 and are heated in separated individual grooves in hot plate 168. One yarn passes through fluid twister 167 which operates to impart Z twist, and the other yarn passes through fluid twister 166 which imparts S twist. Both yarns then pass around the small diameter portion of stepped roll 162 followed by winding up together on a pirn takeup or the like. The pirn takeup is advantageous in allowing plying of the S and Z twist crimped yarns to give a balanced stretch yarn without twist liveliness.

It is essential for the successful processing of yarn according to the string-up of FIGURE 32 that twisting of both yarns begins simultaneously. For this purpose the double-throw dual twister of FIGURE 44 is utilized.

A variation of the above process is particularly useful as applied to monofilament yarns of the type used in ladies' hosiery. Where monofilament yarns of round cross section are used, the smooth cylindrical surface does not offer as much purchase for the fluid vortex and, therefore, twisting is less efficient than with multifilament yarns, although acceptable products can be produced. Multifilament yarns with as few as two filaments per yarn bundle are twisted more effectively, but it is desirable to have as few filaments as possible in hosiery yarn to achieve maximum shearness and freedom from snagging. A process of this invention which appears to provide optimum results in view of these considerations applies the treatment as indicated in FIGURE 34 to a temporarily composite yarn composed of two or more filaments with separate final packaging provided for each filament in the yarn bundle. This requires that the filaments are separated at a point beyond the fluid vortex. Pins or guides located downstream of the fluid twister can be used to accomplish this separation. The resultant monofilament yarns have a corkscrew-like configuration which provides additional stretchiness, bulk, and desirable texture to the product. Similar results may be obtained by applying the process to monofilaments of non-round cross section. In this case the stretch developed in the final knit garment stems largely from the yarn twist liveliness and resulting stitch distortion.

FIGURE 35 illustrates one procedure for utilizing the fluid twister of this invention to twist a yarn bundle coming directly from a spinneret and prior to being drawn. Filaments 110 issue from spinneret 111 and converge in guide 112. Upon leaving the guide, the filaments are divided into two groups and pass upon opposite sides of pin 113. The filaments are twisted immediately upon leaving pin 113 by means of fluid twister 114 farther downstream, the twist imparted by fluid twister 114 backing up to pin 113. No heating zone is necessary with the string-up of FIGURE 35 since the filaments are in a plasticized state upon passing pin 113. Twist imparted to the yarn bundle upon leaving pin 113 is fixed in the yarn either by cooling, evaporation, or otherwise, prior to entering fluid twister 114 from whence it is passed around rollers 115 and 116 and then to backwindable package 118 which is driven by drive roll 117.

In addition to improving crimping and elastic properties of staple and continuous filament yarns the process and apparatus of this invention can be applied to a single continuous filament or to staple roving and to plied roving or spun yarn or, in fact, to any filamentary strand material. While the twist applied to a running threading is false, the twist applied to projected ends of staple fibers is a true twist and the whipping and twisting of these ends about the yarn bundle produce a very coherent product. By applying this process to staple roving, a yarn can be spun at speeds much higher than those obtainable on a conventional spinning frame; and by varying the processing elements, the product can be varied all the way from a conventional spun yarn to a highly bulked stretch-type yarn.

As other variations of this process, two or more different yarns, continuous filament or staple, may be processed simultaneously at the same or different rates of feed speed and at the same or different tension levels with constant or pulsating feed rates, to give yarns of varying characteristics and/or novelty. One such yarn product is analogous to the so-called thick-and-thin yarns with lengths containing high twist (crimped) connected by lengths substantailly untreated or unchanged (uncrimped) and/or an alternating twist yarn. Particularly interesting combinations can be prepared wherein the two different materials (e.g., nylon and rayon) have dissimilar retraction characteristics. The differential retraction characteristics can be enhanced by using two different feed rates or tension levels, thereby increasing the ultimate bulking that will be achieved when the yarns or fabrics are given their final process retraction. Finishing techniques, i.e., shrinking, agitation or the like can improve or modify the bulking characteristics particularly when two dissimilar yarns are used.

While the yarns made by the process of this invention are particularly useful in stretch-type knit fabrics, they also provide useful effects in other fabric forms such as tricot and woven goods. Woven fabrics, particularly those made from yarns of non-round cross sections, show desirable improvements in bulk and texture. High luster or glitter frequently associated with yarns of non-round cross sections is generally reduced by the subject twist-setting process. Examination of such yarns under suitable magnification shows that the filaments are randomly rearranged with respect to one another so as to break up the reflecting planes which tend to produce glitter. Accompanying this effect is a random twist configuration along the individual filaments giving a lengthwise texture not normally associated with simple cross section modifications.

Desirable crepe-like fabrics may also be made of the yarns of this invention. In this case the crepe figure may be developed in fabric finishing by agitated relaxation treatments such as tumble scour provided the fabric construction is sufficiently open to allow yarn distortion under the influence of their twist liveliness. In woven crepe fabric the crimp amplitude tends to be limited by the relatively tight fabric construction as compared with knit fabrics. For this reason, it may be desirable to modify the yarn stretch characteristics for stretch-yarns intended for weaving.

With fibers made of orientable crystallizable polymers, a preferred embodiment of this process comprises stretching the yarns under conditions which produce orientation with a minimum of crystallinity followed by the twist-setting process wherein crystallization accompanies the twist-setting treatment. By this means the fibers are crystallized while in the twisted form. As the twist is removed beyond the fluid jet, the crystal structure tends to be distorted to a greater degree than in the case of the product made from previously crystallized yarns. Examples 80 to 88 show the process as applied to polyethylene terephthalate yarns.

In one method of preparing alternate twist yarns of this invention, zero twist poly(ethylene terephthalate) continuous filament yarn is passed through the feed rolls as in FIGURE 33 at 150 yards per minute; windup speed is 128 yards per minute and yarn tension is 3 grams measured upstream of the hot plate. Process twist is Z. The fluid twister is of the type shown in FIGURES 15 and 16 and operates on 30 pounds per square inch air. The heat-setting temperature is 270°. The fluid twister is slightly misaligned with respect to the direction of travel of the threadline with the result the yarn threadline alternately sticks and slips at the yarn passageway ports so that the yarn is twisted and cranked in a pulsating manner. The pulses permit Z twisted sections of the yarn to pass through the twister without twist removal, with the result that S twisted sections appear in the yarn between the Z twist sections that had escaped the twister action. The resultig yarn in called an alternating twist yarn. It has the appearance of a highly twisted crepe yarn, and is very twist lively and very cohesive. The net twist in the yarn is essentially zero, that is, there are as many turns of S twist as there are Z twist. The yarn product is illustrated in FIGURE 41 and the process in Table I, Example 54.

An alternating twist yarn is made via a process similar to the above except that instead of misaligning the jet the feed rolls are eliminated and the tension gate is vibrated at a rate of about 20 times per second. This causes a corresponding variation in yarn tension and produces an alternating twist product.

Alternating twist continuous filament yarn may be made using the fluid twister shown in FIGURE 22. In this case, the air supply is alternated between opposing air inlets. This gives a positive alternating twist action and a product in which the S and Z portions of twist are very similar to each other in length and structure.

FIGURE 36 illustrates an assembly utilizing a fluid twister of this invention, which assembly may be utilized to produce a wide variety of novel specialty yarns. In the schematic drawing of FIGURE 36, roving is unwound from package 125 in conventional manner and passed in sequence through a trumpet guide 126, drafting rolls 127, and over applicator roll 128 which is revolving in a bath of adhesive solution. The roving is then plasticized in heater 130 and twisted by fluid twister 131 and subsequently wound on package 133 which is driven by drive roll 132. It is not essential that adhesive be applied to the roving during the processing, and it is also not necessary that the roving be plasticized prior to twisting. Either or both of the adhesive application and plasticizing may be omitted or may be utilized, depending upon the particular product desired. In the case where no adhesive is applied to the roving and plasticizing is also omitted, the product produced by the twisting action of the fluid twister is a sheaf-yarn, such as illustrated in FIGURE 40. The product is called a sheaf-yarn because it resembles sheaves of wheat or, more exactly here, sheaves of staple yarn attached end to end and tied at random intervals along its length by staple fibers twisted firmly about the circumference thereof. Intermediate the tightly bound portions of the yarn the staple fibers are substantially parallel to one another.

In utilizing the assembly of FIGURE 36 and processing staple roving as above described but applying an adhesive solution to the roving prior to twisting but omitting any plasticizing of the roving prior to twisting, there is obtained an alternate twist staple yarn having an appearance similar to the twisted yarn shown in FIGURE 41 with the exception that FIGURE 41 is directed to an alternate twist continuous filament yarn. An alternate twist staple fiber yarn has essentially the same configuration but with a somewhat more fuzzy appearance due to the multiplicity of fiber ends protruding from the fiber bundle. When the assembly of FIGURE 36 is operated with a plasticizer, for example, a heat plasticizer, but without application of adhesive, a yarn product with somewhat greater bulk but somewhat less stability than the yarn product is obtained with adhesive application. When adhesive application alone is utilized in the absence of any plasticizing means, it is essential that the adhesive be sufficiently volatile so that it will be set (by polymerization of solvent volatilization) during the interval between application of the adhesive solution and entrance into the fluid twister. The air discharge from the fluid twister accelerates the setting of solvent based adhesives.

Operation of the assembly of FIGURE 36 is illustrated by passing poly(hexamethylene adipamide) staple filament yarn, issuing from the drafting rolls of a commercial spinning frame, through an air twister and then to a windup roll with a surface speed of 23 y.p.m. The yarn path from the drafting rolls, through the twister to a guide, located just prior to the windup, is a straight line. Yarn tension above the twister is 2 grams. Supply air pressure to the twisters is 30 p.s.i.g.

A continuous staple yarn is formed by the above process, which yarn is held together by random filament ends which are wrapped tightly about the yarn axis. The yarn is illustrated in FIGURE 40. The process conditions are shown in Example 50 of Table I.

Viscose rayon staple filament yarn issuing from the drafting rolls 127 of a commercial spinning frame at 50 y.p.m. is treated in the assembly of FIGURE 36 whereby the yarn is passed over an applicator roll 128 and a heated plate 130 prior to entering the pneumatic twister. The applicator rolls apply a size (poly vinyl alcohol emulsion) to the twisted yarn. The hot plate (280° C.) dries the size and fixes the yarn in its twisted configuration. Due to the combination of size and heat, the twist is fixed so tightly that some of the twist passes through the twister unaltered, with the result that opposite hand twist appears in portions of the yarn leaving the twister and the yarn has the appearance illustrated in FIGURE 41. The process and product are described in Example 55 of Table I.

Alternate twist continuous yarns are formed, using the application (of sizing) roll or the heater separately; however, the combined arrangement is preferred. With the hot plate at 230° C., the bonding agent is dried but the twist is removed by the fluid twister, thus yielding a zero-twist yarn made cohesive by the bonding material alone.

A poly(hexamethylene adipamide) continuous filament yarn is coated with viscose staple (1.5 d.p.f., 2½") using the equipment of FIGURE 36. Operating conditions are shown in Example 53 of Table I. The yarn is passed through the forward drafting rolls along with the drafted viscose staple fiber yarn. The filament yarn and staple yarn are immediately integrated by the twist imparted by the fluid twister. The twisted filament-staple yarn then is treated with polyvinyl alcohol by the applicator roll and heated to 250° C. to set the yarn, then passed through the twister to windup. In another example, adhesive is applied to both yarns prior to passage through the drafting rolls to produce a coated yarn having substantially greater bulk than in the case of yarn treated with adhesive after twisting.

By a variation of the assembly of FIGURE 36, it is a simple procedure to add one or more additional yarn structures to the roving prior to twisting, as indicated in the drawing. For example, a yarn package 134 containing either continuous or staple filaments may be passed over pin 135 and joined with the roving as it passes through nip rolls 136. As in the case with the processing of roving alone in accordance with FIGURE 36 assembly, the joint processing of the multiplicity of filamentary structures may be accompanied by the application of an adhesive solution by applicator roller 128 and/or plasticizing thereof by heat or other means at plasticizer station 130. Alternatively, an adhesive solution may be applied to the continuous or staple filament prior to its joining with the roving, or application of adhesive to the roving or to the combination of roving and staple or continuous yarn may be omitted, as desired, to produce a wide variety of novel yarn structures.

FIGURE 37 illustrates an assembly for producing other novel yarns using a fluid twister of this invention. In using the assembly of FIGURE 37, a continuous or staple filament yarn is unwound from package 140, passed over pin 141, through nip rollers 142, and subjected to the rotary twisting action by fluid twister 143. The rotary action upon the yarn is shown by dotted lines 150. In the specific illustration shown, short lengths of a second filamentary material 144 are dropped from reservoir 145 upon the carrier yarn as it is rotated and twisted with the result that the short lengths of filamentary material are wound tightly about the rotating (carrier) yarn and become firmly bound thereto to form slubs. Alternatively, the slubs may be dropped on the carrier yarn downstream of the fluid twister but this procedure is less desirable because slubs are even more firmly bound to the carrying yarn as the yarn carrying the slubs passes through fluid twister 143. The slub yarn product is then passed through nip rollers 147 and wound on package roll 148 which is driven by drive roll 149. In operating in accordance with this embodiment, the carrying yarn may be either staple or continuous filament yarn, and the secondary yarn, which is added to form slubs, may likewise be either staple or continuous filament yarn.

Using the setup shown in FIGURE 37, poly-(hexamethylene adipamide) yarn is taken from a package, passed through the feed rolls, through a fluid twister operating on 40 pounds per square inch air to a windup roll, and finally to a backwindable package. Windup speed is 160 y.p.m. Tension in the threadline is maintained at 10 grams.

Immediately upstream of the twister, pieces of staple yarn (1.5 denier per filament, 3 inch viscose) are fed to the rotating, twisting threadline from a hopper. On contacting the rotating, twisting threadline, the staple fibers are immediately entrained into the threadline by the rapid rotating motion, and form randomly spaced slubs along the threadline. An enlarged illustration of the slubbed yarn is shown in FIGURE 38. The slub yarn is novel in that the slub is held to the carrier yarn with two directions of twist. One end of the slub is twisted in the S direction, the other end is twisted in the Z direction. The process conditions are shown in Example 57 of Table I, and the product is illustrated in FIGURE 38.

Another type of slub yarn (crepe tail slub yarn) is illustrated in FIGURE 42. It is made by running a yarn through the FIGURE 37 setup at a tension of only 3 grams. The high twist imparted to the cold yarn at this low tension causes the yarn to form branched slubs which pass through the twister. The stability of the branched slubs can be improved by size applied before the twister.

These branched slubs can also be produced by plucking the threadline so as to create short rapid tension charges. The product is illustrated in FIGURE 42.

A slub yarn comprising slubs of continuous filament on a continuous filament carrier yarn is prepared by substituting a continuous filament package for the reservoir 145 in FIGURE 37. Running at a speed of 50 y.p.m. and using a fluid twister of the type shown in FIGURES 13 and 14, operated on 30 pounds per square inch air pressure, continuous filament yarn which is to be used for slubbing, is allowed to contact the rotating carrier yarn threadline. The slubbing yarn is immediately wrapped about the carrier yarn and forms slubs which consist of short sections of carrier yarn about which numerous layers of the slubbing yarns are wrapped. The tension on the carrier yarn is maintained constant at between 10 and 25 grams, whereas the tension on the slubbing yarn is varied in a rapid and random fashion between 0 and 25 grams. Wrapping occurs when the tension in the slubbing yarn drops below the tension in the carrier yarn. Layered slubs occur when the tension in the slubbing yarn approaches zero grams. The wrapping and carrying functions of each yarn may be reversed by reversing the relative tension levels. Process conditions are shown in Example 56 of Table I.

The slub yarn product (illustrated in FIGURE 39) is unique in that the slub consists of yarn wrapped about the carrier yarn in the direction of twist that exists upstream of the twister, whereas the unslubbed, but plied sections of the yarn are twisted in the twist direction that exists downstream of the twister.

The fluid twister is particularly adapted to making of slub yarns, since the twister yarn passage offers little resistance to the passage of a slub whereas mechanical twisters snub the yarn over pins, wheels, etc., which would offer substantial resistance to the passage of slubs, with the result that the threadline would be subject to frequent breakdowns.

Using a nozzle of the type shown in FIGURES 1 and 2 whose air port diameter is one-quarter of an inch and whose yarn passageway diameter is one-half an inch, it is possible to spin a real twisted staple fiber. For example, poly(hexamethylene adipamide) staple yarn (2 inches long, 1½ denier per filament) is dropped into the air supply to the nozzle of FIGURE 1. A length of yarn is inserted in the yarn passageway and withdrawn at a rate of 20 yarns per minute. The direction of withdrawal is opposite to the direction of the air port entry to the yarn passageway. The air supply pressure is 60 pounds per square inch. The air stream carrying its entrained staple fibers causes a rapidly rotating vortex in the yarn passageway and rotates the length of yarn initially placed in the yarn passageway at high speed. The rotating yarn wraps the staple fibers, carried by the air stream, about itself, and as the yarn is withdrawn from the yarn passage (in the direction previously indicated), a continuous staple yarn with real twist is formed and is continuously withdrawn from the twister. This yarn is wound on a suitable package and resembles conventional spun staple of a 5/1 cc. Specialty yarns such as slub yarns and covered yarns may be prepared in such an arrangement by running a threadline through the twister while adding staple fibers to the air stream.

As illustrative of one method of operating the process of this invention, poly(hexamethylene adipamide) yarn of a type suitable for tire cord consisting of 240 filaments of approximately 6 denier per filament giving a total yarn denier of 1680 is processed in the general arrangement shown in FIGURE 33. In this case, because of the relatively poor heat transfer through the heavy yarn bundle, it is necessary to use several heating zones interspersed with booster fluid twisters which apply additional torque to the threadline to overcome air drag and other forms of friction tending to reduce the twist level in the twist heating zone. In the example at hand, three conventional slot type heaters are used in sequence. Between the first and second and second and third heaters (in the direction of threadline movement), booster fluid twisters are used supplied with high pressure steam which gives additional plasticizing action. The third heater is made several times the length of the other heaters to remove moisture in order to ensure complete deplasticizing. The zone between the last heater and the final pneumatic twister is also longer than the other similar zones. A transverse flow of air is used in this region to assist threadline cooling. The product collected at the windup in this case shows filament curlines in which the radius of curvature is somewhat larger than that observed with the textile denier yarns but sufficient to be attractive in certain forms of upholstery and carpet yarn uses.

In the examples following, which illustrate the invention, tension on the yarn upstream of the fluid twister is greater than $T_c$. Air velocity is at least ½ sonic.

The examples shown in Table I illustrate the operation of the fluid-twisting devices of this invention and the products which may be produced thereby. Table I indicates for each example the yarn utilized, the conditions under which it was processed, the fluid twister utilized, the type of string-up assembly employed, and the nature of the product produced along with its stretch characteristics in terms of percent steam retraction where these data are pertinent. Air velocity in all examples where air is used as a fluid is at least ½ sonic velocity.

The plasticizing (quenching) medium in all examples is air except that in Example 20 the deplasticizing medium is water, and in Example 29 steam is utilized for quenching. The temperature of the quenching medium is room temperature (26° C.) in all cases except Example 29 where steam at 100° C. is utilized for quenching. The fluid-twisting medium in all examples is air, except that in Example 29 the fluid medium is steam. In Examples 8 through 14 air consumption amounts to 0.7 cubic foot per minute. In all examples illustrating production of stretch-yarn, the yarn is twisted at least 50 turns per inch, and in many instances, over 60 turns per inch.

The examples in Table II indicate certain critical features of the process as applied to poly-(hexamethylene adipamide). Examples 58 and 59 are conducted under identical conditions except that the starting yarn contains 4% and 5% moisture, respectively. The stretch properties of the yarn in the first example are excellent whereas those in the second example are good. This indicates the importance of the uniformity of finish application as described above since the moisture in the finish tends to be retained in the package over long periods of time with little tendency to equilibrate.

In Examples 60 and 61 finish is applied at different levels. In Example 60 the conditions are controlled so that residual oily finish content on the yarn is 0.3%. In Example 61 the finish content is 0.5%. The same finish emulsion is used in both cases but a more rapid rate of application is used in the latter example indicating that a higher percentage of moisture is applied to the yarn. The steam retraction results shows a distinctive advantage for the yarn prepared under Example 60. Examples 62, 63, 64, and 65 concern yarns prepared under identical conditions with the exception of air pressure. That is increased progressively from Example 62 to Example 65. The crimp retraction of these yarns shows a progressive improvement in stretch properties as the pressure is increased. Under these specific conditions, the process becomes inoperable above an air pressure of 170 lbs.

In Table II the supply yarn is 70/34 poly(hexamethylene adipamide) in an undrawn and zero twist state; the fluid twister is the type shown in FIGURE 43. The twisting action in each example is direct and a stretch yarn with the retraction values tabulated is produced.

In the coupled process wherein drawing and stretch processing is carried out without intermediate packaging, the number of wraps on the draw roll is sometimes critical. Examples 66, 67 and 68, with 3, 4 and 5 wraps respectively, show that in this series 4 wraps give the best product.

In a similar series of experiments, Examples 77, 78 and 79, the surface of the draw roll is varied and the manner in which the yarn leaves the draw roll is also varied. In Example 77, the surface of the draw roll is of fine grain roughness (matte). In Example 78, the same matte roll surface is used with an added rubber surfaced roll to give a pinch effect. In Example 79, a ground and polished roll surface is used. In all three of these examples, 4 wraps are used in common. The results indicate a definite preference for the methods of Examples 78 and 79 as compared with Example 77. The factor in common which may explain this result is the reduced relaxation time which is controlled by the more effective gripping action of the snub roll in the case of Example 78 and the higher friction to the smooth surface roll in the case of Example 79.

In Examples 72 and 73 the arrangements and settings are similar for both, but a double pass heater is used for Example 72. The heater and string-up arrangement of FIGURE I is used for Example 73. The heater of Example 72 carries the thread over the heater surface on the upward pass in effect preheating the yarn before it enters the down pass, false-twisting zone. It may be seen that a temperature of 260° C. produces a better product in this case than the considerably higher temperature of 350° C. where the single heating zone is used.

Examples 89 and 90 in Table II illustrate the usefulness of a polyamide of p-xylylene diamine and azelaic acid in this invention.

The examples of Table III illustrate stretch products of 70/34 poly(ethylene terephthalate) yarn having semi-dull finish, 4.3 grams per denier tenacity and 23% elongation. The twister of FIGURE 43 is utilized at a yarn feed speed of 427 yards per minute.

The examples of Table IV illustrate preparation of low denier stretch yarn of poly(hexamethylene adipamide) suitable for ladies' hose. Products of Examples 91, 92 and 94 are prepared using the coupled drawing-twisting process shown in FIGURE 34, and those of Examples 93, 95, 96 and 97 are prepared using the dual thread processing assembly of FIGURE 32. All yarns are continuous filament yarns freshly drawn prior to twisting and having an initial twist of about 0.1 turn per inch. Upstream tension on the yarn is about 2 grams. The heat-setting is accomplished by passing the yarn at speeds ranging from 425 to 780 yards per minute through a slot 1/16 inch x 1/4 inch x 10 inches heated at 225° C. Air pressure is 95 p.s.i.g. and twisting action is direct. The twister has an air passage diameter of 0.025 inch and a yarn passage diameter of 0.025 inch.

TABLE I

| Example | 1 | 2 | 3 | 4 | 5 | 6 | 7 |
|---|---|---|---|---|---|---|---|
| Yarn material | Poly (hexamethylene adipamide). | Same as 1 | Same as 1 | Same as 1 | Same as 1 | Same as 1 | Same as 1. |
| Denier | 70 | 70 | 70 | 200 | 70 | 40 | 70. |
| No. Filaments | 34 | 34 | 34 | 13 | 34 | 13 | 34. |
| Source | Shipping Package. | Same as 1 | Same as 1 | Same as 1 | Same as 1 | Same as 1 | Same as 1. |
| Type of yarn | Continuous | Continuous | Continuous | Continuous | Continuous | Continuous | Continuous. |
| Initial twist | ½Z | ½Z | ½Z | ½Z | ½Z | ½Z | ½Z. |
| Feed speed (y.p.m.) | 103 | 158 | 645 | 115 | 451 | Tension gate | 115. |
| Windup speed (y.p.m.) | 85 | 128 | 597 | 95 | 400 | 100-500 | 100. |
| Tension (gms.) | 2 | 4 | 1-2 | 2 | 2 | 5 | 0.1. |
| Process Twist | S | S | Z | Z | Z | Z | S. |
| Fluid twister | Figs. 15 & 16 | Figs. 15 & 16 | Fig. 31 | Fig. 31 | Figs. 9 & 10 | Fig. 31 | Figs. 13 & 14. |
| Heat-setting temp., ° C | 250 | 270 | 325 | 260 | 325 | 240 | 260. |
| Type heater | Hot Slot 1/16" x 13". | Hot Slot 1/16" x 13". | Hot Slot 1/16" x 26". | Hot Slot 1/16" x 13". | Hot Slot 1/16" x 26". | Hot Plate 30". | Hot Slot 1/16" x 13". |
| Air pressure (p.s.i.g.) | 60 | 60 | 65 | 65 | 90 | 65 | 40. |
| Twisting action | Direct | Direct | Reverse | Reverse | Direct | Reverse | Direct. |
| Turns per minute | 215,000 | 340,000 | 1,200,000 | 240,000 | 900,000 | | |
| Percent steam retraction | 128 | 100 | 100 | 100 | 93 | | 100. |
| Product characterization | Stretch yarn | Stretch yarn | Stretch yarn | Stretch yarn | Stretch yarn | Stretch yarn | Stretch yarn. |
| Air passage diam. (inches) | 5 holes at: .031 | 5 holes at: .031 | 12 holes at: .063 | 12 holes at: .063 | 1 hole at: .025 | 12 holes at: .063 | 1 hole at: .094. |
| Yarn passage diam. (inches) | .047 | .063 | .313 | .313 | .035 | .313 | .188. |

TABLE I.—Continued

| Example | 8 | 9 | 10 | 11 | 12 | 13 | 14 |
|---|---|---|---|---|---|---|---|
| Yarn material | Poly (hexamethylene adipamide). | Same as 8 | Same as 8 | Same as 8 | Same as 8 | Same as 8 | Same as 8. |
| Denier | 70 | 70 | 70 | 70 | 70 | 70 | 70. |
| No. Filaments | 34 | 34 | 34 | 34 | 34 | 34 | 34. |
| Source | Shipping Package. | Same as 8 | Same as 8 | Same as 8 | Same as 8 | Same as 8 | Same as 8. |
| Type of yarn | Continuous | Continuous | Continuous | Continuous | Continuous | Continuous | Continuous. |
| Initial twist | ½Z | ½Z | ½Z | ½Z | ½Z | ½Z | ½Z. |
| Feed speed (y.p.m.) | Tension gate | Tension gate | Tension gate | 341 | 330 | 326 | 322. |
| Windup speed (y.p.m.) | 400 | 450 | 500 | 309 | 309 | 309 | 309. |
| Tension (gms.) | 1.5 | 1.5 | 1.2 | 1.5 | 2.5 | 3.5 | 6.0–7.5. |
| Process twist | S | S | S | S | S | S | S. |
| Fluid twister | Figs. 9 & 10 | Figs. 9 & 10 | Figs. 9 & 10 | Figs. 9 & 10 | Figs. 9 & 10 | Figs. 9 & 10 | Figs. 9 & 10. |
| Heat-setting temp., ° C | 325 | 325 | 325 | 325 | 325 | 325 | 325. |
| Type heater | Hot Slot 1/16" x 13". | Hot Slot 1/16" x 13". | Hot Slot 1/16" x 13". | Hot Slot 1/16" x 13". | Hot Slot 1/16" x 13". | Hot Slot 1/16" x 13". | Hot Slot 1/16" x 13". |
| Air pressure (p.s.i.g.) | 100 | 100 | 100 | 100 | 100 | 100 | 100. |
| Twisting action | Direct | Direct | Direct | Direct | Direct | Direct | Direct. |
| Turns per minute | 950,000 | 1,080,000 | 1,150,000 | 800,000 | 770,000 | 680,000 | 630,000–400,000. |
| Percent steam retraction | 124 | 87 | 53 | 144 | 144 | 75 | 50–35. |
| Product characterization | Stretch yarn | Stretch yarn | Stretch yarn | Stretch yarn | Stretch yarn | Stretch yarn | Stretch yarn. |
| Air passage diam. (in.) | .025 | .025 | .025 | .025 | .025 | .025 | .025. |
| Yarn passage diam. (in.) | .025 | .025 | .025 | .025 | .025 | .025 | .025. |

| Example | 15 | 16 | 17 | 18 | 19 | 20 | 21 |
|---|---|---|---|---|---|---|---|
| Yarn material | Poly (hexamethylene adipamide). | Same as 15 | Same as 15 | Same as 15 | Same as 15 | Same as 15 | Same as 15. |
| Denier | 70 | 40 | 20 | 14 | 15 | 70 | 70. |
| No. Filaments | 34 | 34 | 7 | 2 | 1 | 34 | 34. |
| Source | Shipping Package. | Same as 15 | Same as 15 | Same as 15 | Same as 15 | Same as 15 | Same as 15. |
| Type of yarn | Continuous | Continuous | Continuous | Continuous | Continuous | Continuous | Continuous. |
| Initial twist | ½Z | ½Z | ½Z | Zero | Zero | ½Z | ½Z. |
| Feed speed (y.p.m.) | 225 | Tension gate | Tension gate | 117 | 115 | 160 | 225. |
| Windup speed (y.p.m.) | 200 | 76 | 141 | 100 | 100 | 143 | 200. |
| Tension (gms.) | 1.5 | 3 | 1 | 1 | 1 | 3 | 6. |
| Process twist | Z | S | S | | | Z | Z. |
| Fluid Twister | Figs. 9 & 10 | Fig. 31 | Figs. 15 & 16 | | | Fig. 31 | Figs. 9 & 10. |
| Heat-setting temp., ° C | 270 | 258 | 274 | 238 | 240 | 262 | |
| Type heater | Hot Slot 1/16" x 13". | Hot Plate 30". | Hot Slot 1/16" x 13". | Hot Plate 30". | Hot Slot 1/16" x 13". | Hot Plate 30". | |
| Air pressure (p.s.i.g.) | 100 | 65 | 70 | 40 | 40 | 65 | 100. |
| Twisting action | Direct | Reverse | Direct | Direct | Direct | Reverse | Direct. |
| Turns per minute | | | | | | | |
| Percent gteam retraction | 90 | | 274 | | | 93 | |
| Product characterization | Stretch yarn | Stretch yarn | Stretch yarn | Stretch bifilament yarn. | Stretch monofilament yarn. | Stretch filament yarn. | Crimped yarn. |
| Air passage diam. (inches) | 1 hole at: .031 | 12 holes at: .063 | 5 holes at: .031 | 1 hole at: .063 | 1 hole at: .063 | 12 holes at: .063 | 1 hole at: .025. |
| Yarn passage diam. (inches) | .010 | .313 | .063 | .063 | .063 | .313 | .025. |

| Example | 22 | 23 | 24 | 25 | 26 | 27 | 28 |
|---|---|---|---|---|---|---|---|
| Yarn material | Poly (hexamethylene adipamide) undrawn. | Same as 22 | Poly (ethylenetereph-thalate). | Same as 24 | Same as 24 | Same as 24 | Same as 24. |
| Denier | 252(undrawn) | 252(undrawn) | 70 | 70 | 70 | 40 | 40. |
| No. Filaments | 34 | 34 | 34 | 34 | 34 | 27 | 27. |
| Source | Spin Bobbin | Spin Bobbin | Spin Bobbin | Spin Bobbin | Supply Package. | Same as 26 | Same as 26. |
| Type of yarn | Continuous | Continuous | Continuous | Continuous | Continuous | Continuous | Continuous. |
| Initial twist | Zero | Zero | Zero | Zero | Zero | Zero | Zero. |
| Feed speed (y.p.m.) | 103 (draw roll speed). | 98 (feed roll speed). | 117 | 114 | 150 | 114 | 120. |
| Windup speed (y.p.m.) | 77 (windup roll speed). | 350 (windup roll speed). | 100 | 100 | 128 | 101 | 101. |
| Tension (gms.) | 1.8 | 6 | 4 | 4 | 3.5 | 1.3 | 1.5. |
| Process Twist | S | Z | Z | S | | S | Z. |
| Fluid twister | Figs. 11 & 12 | Figs. 15 & 16 | | | Figs. 11 & 12 | | |
| Heat-setting temp., ° C | 240 | 230 | 240 | 240 | 265 | 270 | 265. |
| Type heater | Hot Slot 1/16" x 13". | Radiant tube | Hot Slot 1/16" x 13". | Hot Slot 1/16" x 13". | Hot Slot 1/16" x 13". | Hot Slot 1/16" x 13". | Hot Slot 1/16" x 13". |
| Air pressure (p.s.i.g.) | 19 | 48 | 40 | 40 | 30 | 80 | 75. |
| Twisting action | Direct | Direct | Direct | Direct | Direct | Direct | Direct. |
| Turns per minute | 220,000 | | 240,000 | | | | |
| Percent steam retraction | 115 | | 115 | 115 | 87 | 195 | 154. |
| Product characterization | 70–30 stretch yarn. | Bulked yarn | Stretch filament yarn. | Stretch filament yarn. | Stretch yarn | Stretch yarn | Stretch yarn. |
| Air passage diam. (inches) | 10 holes at: .031 | 5 holes at: .031 | 1 hole at: .031 | 1 hole at: .063 | 10 holes at: .031 | 1 hole at: .063 | 1 hole at: .063. |
| Yarn passage diam. (inches) | .063 | .063 Simultaneous twisting and drawing. | .063 | .063 | .063 | .063 | .063. |

TABLE I.—Continued

| Example | 29 | 30 | 31 | 32 | 33 | 34 | 35 |
|---|---|---|---|---|---|---|---|
| Yarn material | Poly(ethylene-terephthalate). | Poly(epsilon capro-amide). | Fortisan (a regenerated cellulose). | Polyacrylo-nitrile. | Polyethylene | Vinyon N | Raw Silk. |
| Denier | 70 | 70 | 90 | 100 | 66 | 130 | |
| No. Filaments | 34 | 34 | 120 | 40 | 20 | 160 | |
| Source | Supply package. | Same as 29 | Same as 29 | Same as 29 | Same as 29 | Same as 29 | Same as 29. |
| Type of yarn | Continuous | Continuous | Continuous | Continuous | Continuous | Continuous | Continuous. |
| Initial twist | Zero | | 3Z | 0.3Z | 7Z | 3Z | |
| Feed speed (y.p.m.) | 118 | 115 | 106 | 115 | 115 | 115 | 110. |
| Windup speed (y.p.m.) | 110 | 100 | 100 | 100 | 100 | 100 | 100. |
| Tension (gms.) | 3 | 1-2 | 1-2 | 1-2 | 1-2 | 1-2 | 1-2. |
| Process twist | Z | S | S | S | S | S | S. |
| Fluid twister | Fig. 27 | Fig. 27 | Fig. 27 | Fig. 27 | Fig. 27 | Fig. 27 | Fig. 27. |
| Heat-setting temp., ° C | 265 | 240 | 200 | 220 | 175 | 160 | 160. |
| Type heater | Hot Slot 1/16" x 13". | Same as 29 | Same as 29 | Same as 29 | Same as 29 | Same as 29 | Same as 29. |
| Air pressure (p.s.i.g.) | 40 | 40 | 40 | 40 | 40 | 40 | 40. |
| Twisting action | Direct | | | | | | |
| Turns per minute | | 240,000 | 240,000 | 240,000 | 240,000 | 240,000 | 240,000. |
| Percent steam retraction | 95 | | | | | | |
| Product characterization | Stretch yarn | Stretch yarn | Stretch yarn | Stretch yarn | Bulked yarn | Bulked yarn | Crimped yarn. |
| Air passage diam. (in.) | 1 hole at: .063 | 1 hole at: .063 | 1 hole at: .063 | 1 hole at: .063 | 1 hole at: .063 | 1 hole at: .063 | 1 hole at: .063. |
| Yarn passage diam. (in.) | .063 | .063 | .063 | .063 | .063 | .063 | .063. |

| Example | 36 | 37 | 38 | 39 | 40 | 41 | 42 |
|---|---|---|---|---|---|---|---|
| Yarn material | Viscose rayon | Cellulose acetate. | Cellulose triacetate. | See below [1] | Fiberglas | Cellulose acetate. | Poly(ethylene terephtha-late). |
| Denier | 150 | 100 | 292 | 84 | 110 | 100 | 1.5 d.p.f. |
| No. Filaments | 40 | 32 | 80 | 40 | 15 | 32 | 2½. |
| Source | Supply Package. | Same as 36 | Same as 36 | Same as 36 | Same as 36 | Same as 36 | Same as 36. |
| Type of yarn | Continuous | Continuous | Continuous | Continuous | Continuous | Continuous | Staple 40/2 cc. |
| Initial twist | 2.5 | Zero | Zero | ½Z | | Zero | Z. |
| Feed speed (y.p.m.) | 44 | 24 | 43 | 51 | 105 | 24 | Tension |
| Windup speed (y.p.m.) | 42 | 22.5 | 42 | 22.5 | 100 | 22.5 | 74. |
| Tension (gms.) | 2 | 1-2 | 4 | 1.3 | 1-2 | 1.2 | 7. |
| Process twist | S | Z | Z | Z | | S | Z. |
| Fluid twister | Figs. 11 & 12 | Fig. 27 | Fig. 27 | Fig. 27 | | Figs. 5 & 6 | |
| Heat-setting temp., ° C | 180 | 200 | 295 | 200 | 500 | 200 | 230. |
| Type heater | Hot Tube ½" x 13". | Hot Tube ½" x 13". | Hot Tube ½" x 13". | Hot Tube ½" x 13". | | Hot Tube ½" x 13". | Hot Slot ⅛" x 13". |
| Air pressure (p.s.i.g.) | 30 | 40 | 15 | 24 | 40 | 15 | 80. |
| Twisting action | Direct | Direct | Direct | Direct | Direct | Direct | Direct. |
| Turns per minute | 110,000 | | | | 240,000 | | 150,000. |
| Product characterization | Stretch yarn | Bulked yarn | Stretch yarn | Stretch yarn | Crimped yarn. | Stretch yarn | Stretch staple yarn with reduced fuzz. |
| Air passage diam. (inches) | 10 holes at: .031 | 1 hole at: .063 | 1 hole at: .063 | 1 hole at: .063 | 1 hole at: .063 | 1 hole at: .063 | 1 hole at: .063. |
| Yarn passage diam. (inches) | .063 | .063 | .063 | .063 | .063 | .063 | .063. |
| Remarks | | | | | Yarn wet with 20% acetone in water, before entering heater. | | |

| Example | 43 | 44 | 45 | 46 | 47 | 48 | 49 |
|---|---|---|---|---|---|---|---|
| Yarn material | Poly(ethylene terephtha-l ate). | Same as 43 | Same as 43 | Casein | Wool | Cotton | Linen. |
| Denier | 1.5 d.p.f. | 1.5 d.p.f. | 1.5 d.p.f. | | | 40 | |
| No. Filaments | 2½" | 2½" | 2½" | | | 1 | |
| Source | Supply package. | Same as 43 | Same as 43 | | | | |
| Type of yarn | 40/1 cc. staple yarn. | Same as 43 | Same as 43 | Staple | Staple | Staple | Staple. |
| Initial twist | Z | Z | Z | | | | |
| Feed speed (y.p.m.) | 44 | 44 | 40 | 110 | 110 | 105 | 105. |
| Windup speed (y.p.m.) | 43 | 43 | 40 | 100 | 100 | 100 | 100. |
| Tension (gms.) | 6 | 6 | 20 | 1-2 | 1-2 | 1-2 | 1-2. |
| Process twist | Z | S | Z | S | S | S | S. |
| Fluid twister | Figs. 11 & 12 | Figs. 11 & 12 | Figs. 11 & 12 | | | | |
| Heat-setting temp., ° C | 170 | 90 | 26 | 150 | 130 | 180 | 190. |
| Type heater | Hot Slot ⅛" x 12". | Hot Slot ⅛" x 13". | | | | | |
| Air pressure (p.s.i.g.) | 30 | 20 | 50 | 40 | 40 | 40 | 40. |
| Twisting action | Direct | Direct | Direct | | | | |
| Turns per minute | 100,000 | 100,000 | 100,000 | 240,000 | 240,000 | 240,000 | 240,000. |
| Product characterization | Stretch staple yarn with reduced fuzz. | Same as 43 | Reduced fuzz staple yarn. | Crimped yarn. | Crimped yarn. | Crimped yarn. | Crimped yarn. |
| Air passage diam. (inches) | 10 holes at: .031 | 10 holes at: .031 | 10 holes at: .031 | 1 hole at: .063 | 1 hole at: .063 | 1 hole at: .063 | 1 hole at: .063. |
| Yarn passage diam. (inches) | .063 | .063 | .063 | .063 | .063 | .063 | .063. |
| Remarks | Process twist opposite to initial yarn twist. Yarn is twisted through zero point. | | | | | | |

TABLE I—Continued

| Example | 50 | 51 | 52 | 53 |
|---|---|---|---|---|
| Yarn material | Poly(hexamethylene adipamide). | Same as 50 | Same as 50 | Same as 50. |
| Denier | 1.5 | 70 | 70 | 70–34 filament. |
| No. Filaments | | 34 | 34 | 1.50, 2½" staple. |
| Source | Bobbin | Supply Package | Same as 51 | Same as 51. |
| Type of yarn | Staple roving | Continuous fil. | Same as 51 | Filament and staple. |
| Initial twist | | ½Z | ½Z | |
| Feed speed (y.p.m.) | | Tension gate | 41 | 9. |
| Windup speed (y.p.m.) | 23 | 40 | 40 | 7.7. |
| Tension (gms.) | 2 | 5 | 5 | 2. |
| Process twist | Z | S | Z | Z. |
| Fluid twister | Figs. 11 and 12 | Fig. 31 | Fig. 27 | Figs. 13 and 14. |
| Heat-setting temp., ° C | | | 258 | 250. |
| Type heater | None | | Hot Plate 30" | Hot Plate 30". |
| Air pressure (p.s.i.g.) | 30 | 65 | 60 | 30. |
| Twisting action | | | | |
| Product characterization | Sheaf yarn. | Semi staple yarn. | Bulked yarn [2] | Staple covered yarn. |
| Air passage diam. (inches) | 10 holes at: .031 | 12 holes at: .063 | 1 hole at: .063 | 1 hole at: .094. |
| Yarn passage diam. (inches) | .063 | .313 | .063 | .188. |
| Remarks | Drafted staple fibers fed to a fluid twister are converted into a continuous yarn, see Fig. 35. | Note: Cutting edge placed upstream of twister breaks filaments which are then wrapped into the threadline. | | Staple and continuous filament yarn combined using the setup shown in Fig. 35. |

See footnotes at end of table.

| Example | 54 | 55 | 56 | | 57 | |
|---|---|---|---|---|---|---|
| | | | Carrier | Slub | Carrier | Slub |
| Yarn material | Poly(ethylene terephthalate). | Vicose rayon | Poly(hexamethylene adipamide). | Same | Poly(hexamethylene adipamide). | Viscose. |
| Denier | 70 | 1.5, 3" | 70 | 40 | 70 | 1.5, 3". |
| No. Filaments | 34 | | 34 | 13 | 34 | |
| Source | Same as 51 | Bobbin | Supply package | | Pirn | Bobbin. |
| Type of yarn | Continuous | Staple | Continuous | | Continuous | Staple. |
| Initial twist | Zero | | ½Z | | ½Z | |
| Feed speed (y.p.m.) | 150 | 5 | | | Tension gate | |
| Windup speed (y.p.m.) | 128 | 5 | 50 | | 160 | |
| Tension (gms.) | 3 | 10 | 10–25 | 0–25 | 20 | |
| Process twist | Z | Z | | | S | S. |
| Fluid twister | Figs. 15 and 16 | Figs. 15 and 16 | Figs. 13 and 14 | | Figs. 15 and 16 | |
| Heat-setting temp., ° C | 270 | 280 | | | | |
| Type of heater | Hot Slot 1/16" x 13" | Hot Plate 30" | None | | None | |
| Air pressure (p.s.i.g.) | 30 | 30 | 30 | | 40 | |
| Twisting action | Direct | Direct | Direct | | Direct | |
| Product characterization | Crepe-like cohesive yarn. | Alternating twist staple yarn. | Slub yarn | | Slub yarn | |
| Air passage diam. (inches) | 5 holes at: .031 | 10 holes at: .031 | 1 hole at: .040 | | | |
| Yarn passage diam. (inches) | .047 | .063 | .063 | | | |
| Remarks | Jet misaligned with respect to yarn travel direction, operates in a pulsating manner. | Size applied to threadline, while in twisted condition upstream of heater. | Tension on 40–13 yarn varied randomly. Slub produced at low tension (approx. 0). | | Staple fibers are brought into contact with twisting continuous filaments in Fig. 37. Product shown in Fig. 38. | |

[1] Poly(ethylene piperazine N,N'-dicarboxylate).
[2] A fluid jet for expanding yarn as described in application Serial No. 443,313 by A. L. Breen (now abandoned) was placed downstream of the fluid twister to produce a special bulked yarn.

TABLE II

| Example | 58 | 59 | 60 | 61 | 62 | 63 | 64 | 65 | 66 | 67 | 68 | 69 |
|---|---|---|---|---|---|---|---|---|---|---|---|---|
| Luster | [1] SD | SD | SD | SD | SD | SD | SD | SD | SD | SD | SD | SD |
| Feed speed (y.p.m.) | 427 | 427 | 427 | 427 | 427 | 427 | 427 | 427 | 427 | 427 | 427 | 427 |
| Draw ratio | 3.32 | 3.32 | 3.32 | 3.32 | 3.3 | 3.3 | 3.3 | 3.3 | 3.3 | 3.3 | 3.32 | ----- |
| Overfeed, percent | 15 | 15 | 15 | 15 | 15 | 15 | 15 | 15 | 15 | 15 | 15 | 15 |
| Process twist direction | S | S | Z | Z | Z | Z | Z | Z | Z | Z | Z | Z |
| Hot plate temp., ° C | 360 | 360 | 360 | 360 | 360 | 360 | 360 | 360 | 335 | 335 | 340 | 340 |
| Air pressure (p.s.i.) | 120 | 120 | 120 | 120 | 90 | 110 | 130 | 150 | 132 | 132 | 130 | 130 |
| Stream retraction, percent | 135 | 112 | 132 | 110 | 65 | 79 | 100 | 120 | 155 | 100 | 71 | 112 |

| Example | 70 | 71 | 72 | 73 | 74 | 75 | 76 | 77 | 78 | 79 | 89 | 90 |
|---|---|---|---|---|---|---|---|---|---|---|---|---|
| Luster | [1] SD | SD | SD | SD | SD | SD | Dull | SD | SD | SD | SD | SD |
| Feed Speed (y.p.m.) | 427 | 427 | 427 | 427 | 427 | 427 | 427 | 427 | 427 | 427 | 427 | 427 |
| Draw ratio | ----- | 3.32 | 3.32 | 3.32 | 3.32 | 3.32 | 3.32 | 3.32 | 3.32 | 3.32 | ([3]) | ([3]) |
| Overfeed, percent | 15 | 15 | 14.3 | 15 | 15 | 15 | 15 | 15 | 15 | 15 | 15 | 15 |
| Process twist direction | Z | Z | Z | Z | Z | Z | Z | Z | Z | Z | Z | ----- |
| Hot plate temp., ° C | 340 | 350 | 260 | 350 | 350 | 350 | 350 | 340 | 340 | 340 | 200 | 200 |
| Air pressure (p.s.i.) | 130 | 150 | 150 | 150 | 150 | 150 | 150 | 130 | 130 | 130 | 110 | 110 |
| Stream retraction, percent | 46 | 117 | 147 | 132 | 26 | 132 | 106 | 97 | 144 | 138 | 220 | 225 |

[1] Semi-dull.
[2] Hot pin at 75° C. 3.6.
[3] Same as 89.

TABLE III

| Example | Hot Plate Temp., ° C. | Air Pressure (p.s.i.g.) | Upstream Tension (gms.) | Steam Retraction (percent) |
|---|---|---|---|---|
| 80 | 320 | 80 | 4.5 | 138 |
| 81 | 340 | 80 | 5.0 | 162 |
| 82 | 360 | 80 | 4.8 | 156 |
| 83 | 320 | 100 | 5.0 | 174 |
| 84 | 340 | 100 | 6.0 | 169 |
| 85 | 360 | 100 | 5.5 | 101 |
| 86 | 320 | 120 | 6.0 | 126 |
| 87 | 340 | 120 | 6.0 | 145 |
| 88 | 360 | 120 | 6.5 | 77 |

the yarn as it passes through the fluid twister. The product is an alternate-twist stretch-yarn having in combination the characteristics and properties of both alternate-twist yarns and stretch-yarns.

Example 101

The procedure of Example 1 is carried out using a continuous filament poly(hexamethylene adipamide) yarn but the rate of twisting is varied by alternately twisting the yarn in the "S" and "Z" directions using the twister of FIGURE 22 in the apparatus of FIGURE 33. There are 60 twist reversals per minute and a tension compensating device is used to take up tension during the twist reversals.

TABLE IV

| Example | 91 | 92 | 93 | 94 | 95 | 96 | 97 |
|---|---|---|---|---|---|---|---|
| Denier | 15 | 15 | 15 | 15 | 15 | 30 | 40. |
| No. Filaments | 1 | 2 | 2 | 4 | 4 | 10 | 14. |
| Type of False Twist | Unidirect. S or Z. | Unidirect. both fil. S or Z. | Balanced one fil. S and 1 fil. Z. | Unidirect. all fil. S and Z. | Balanced two fil. S and 2 fil. Z. | Balanced 5 fil. S and 5 fil. Z. | Balanced 7 fil. S and 7 fil. Z. |
| Feed Speed, y.p.m. | 425-780 | 425-780 | 425-780 | 425 | 425-780 | 425 | 425. |
| Windup Speed, y.p.m. | 399-731 | 399-731 | 399-731 | 399 | 399-731 | 399 | 399. |
| Process Twist | S or Z | S or Z | S and Z | S or Z | S and Z | Not measured. S and Z | S and Z. |
| Percent Steam Retraction | 4 | 135-450 | 2-12 | 157-390 | 150-380 | 97-241 | 137-166. |
| Product Characterization | Stretch monofil. | Stretch bi-fil. | Stretch bi-fil. | Stretch multifil. | Stretch multifil. | Stretch multifil. | Stretch multifil. |

Example 98

A heated fluid can be used in the twisting process of this invention with either continuous filament or staple yarn. Thus, there is obtained a combined plasticizing and heat-setting action while in the over-twisted condition. Using a simple torque jet as shown in FIGURES 1 and 2, a single ply, 18 cotton count, 15 "Z" twist spun yarn composed of 3 inch, 2.5 denier poly(hexamethylene adipamide) fibers is false-twisted to about 30 turns per inch. Air is supplied at 90 p.s.i. to give a flow at near sonic velocity of 0.5 ft.$^3$ of free air per minute. The nozzle was heated to 240–250° C. to plasticize and crimp-set the yarn while in the false-twisted condition. Many of the free fibers ends were wrapped around the yarn bundle to give a sheaf-yarn with improved pill resistance as well as bulk.

Example 99

The process of Example 98 was repeated using superheated steam at 200° C. and 50 p.s.i. in place of the air and heating of the nozzle. The yarn was a single ply, 40 cotton count, 15 "S" twist spun yarn composed of 1½ inch, 2 denier poly(ethylene terephthalate) fiber. Yarn speed was 200 yards per minute and yarn tension was adjusted so that the processing was carried out at constant length. At this tension level most of the fluid energy was utilized in wrapping the free fiber ends around the yarn bundle to give a sheaf yarn. This yarn when woven into fabric had much improved pill resistance as compared to starting yarn. The hand of the fabric had a pronounced crispness as well.

The yarn products produced by twisting yarn in a fluid vortex in accordance to this invention are structurally unique and novel besides being characterized by superior uniformity as compared to prior art yarns prepared with mechanical twisters. In the twisted yarn products of the instant invention individual filaments and groups of filaments are twisted even apart from any bundle twist that may be present. This intra-filament twisting is thought to provide the yarn products, particularly the stretch yarns, with that unusual uniformity and cohesiveness which these yarns manifest.

Example 100

The procedure of Example 2 is carried out using a continuous filament poly(hexamethylene adipamide) yarn but the rate of twisting is varied by varying the tension on The product is an alternate-twist stretch-yarn having both the characteristics and properties of both alternate-twist yarns and stretch-yarns. The product has a steam retraction of 30%.

We claim:

1. A process for twisting a filamentary strand which comprises continuously directing a jet of compressible fluid at at least ½ sonic velocity against the periphery of successive substantially straight portions of the filamentary strand constrained so that the strand, under the action of the fluid jet, moves in a rotary twisting motion, twisting the strand at a rate equivalent to at least 200,000 turns per minute.

2. A process for twisting a filamentary strand comprising continuously directing a jet of compressible fluid at at least ½ sonic velocity against the periphery of successive portions of the filamentary strand maintained at a tension of less than about 60 grams to twist the yarn at a rate equivalent to at least 200,000 turns per minute, each portion of the strand, while under the direct influence of the fluid jet, being substantially straight.

3. The process of claim 2 in which the fluid is a gas.

4. The process of claim 2 in which the fluid is air.

5. The process of claim 4 in which the air is at sonic velocity.

6. The process of claim 4 in which the air, after impinging against the periphery of the filamentary strand, is directed substantially along the axial length of the yarn.

7. A process for producing a stretch-yarn which comprises continuously feeding yarn under a tension of less than about 15 grams through a jet of a compressible fluid intermediate a fixed feed point and a fixed takeup point and crimping the yarn between said points by continuously (1) directing the jet of compressible fluid at at least ½ sonic velocity against the periphery of successive portions of the yarn, while these portions are maintained substantially straight, to twist the yarn at a rate equivalent to at least 200,000 turns per minute, (2) plasticizing that length of twisted yarn which is between the feed point and jet of fluid, (3) deplasticizing the yarn before it enters the jet of fluid, and then (4) back-twisting that portion of the yarn which is between the fluid jet and the takeup point, both initial and back-twisting being accomplished by the false-twisting action of the jet of fluid.

8. The process of claim 7 in which the compressible fluid is air.

9. A process for drawing and twisting a filamentary strand in one operation comprising drawing the filamentary strand and, prior to packaging the drawn strand, continuously directing a jet of compressible fluid at at least ½ sonic velocity against the periphery of successive substantially straight portions of the filamentary strand intermediate a fixed feed point and a fixed takeup point to twist the strand at a rate equivalent to at least 200,000 turns per minute, plasticizing that portion of the twisted strand which is between the feed point and the jet of fluid, deplasticizing the yarn before it enters the jet of fluid, and then back-twisting that portion of the yarn which is between the fluid jet and the takeup point, both initial twisting and back-twisting being accomplished by the false-twisting action of the jet of fluid.

10. The process of claim 9 in which the fluid is air.

11. The process of claim 10 in which the strand is plasticized by heat.

12. A process for producing a sheaf-yarn which comprises continuously directing a jet of compressible fluid at at least ½ sonic velocity against the periphery of successive substantially straight portions of a strand of staple fibers constrained so that the strand, under the action of the fluid jet, moves in a rotary twisting motion to twist the yarn at a rate equivalent to at least 200,000 turns per minute, and winding the yarn product as a back-windable package.

13. A process for drawing and twisting a filamentary strand in one operation comprising drawing the filamentary strand and, prior to packaging the drawn strand, continuously directing a jet of compressible fluid at at least ½ sonic velocity against the periphery of successive substantially straight portions of the strand, constrained so that the strand, under the action of the fluid, moves in a rotary twisting motion to twist the yarn at a rate equivalent to at least 200,000 turns per minute.

14. The process of claim 13 in which the compressible fluid is air.

15. A process for producing an alternate-twist stretch-yarn which comprises continuously false-twisting a continuous strand of fibers at a variable rate of twisting, said twisting being carried out by feeding the strand under a tension of less than about 15 grams through a jet of a compressible fluid intermediate a fixed feed point and a fixed takeup point and crimping the yarn between said points by continuously (1) directing the jet of compressible fluid at at least ½ sonic velocity against the periphery of successive portions of the strand, while these portions are maintained substantially straight, to twist the strand at a rate equivalent to at least 200,00 turns per minute, (2) plasticizing that length of twisted strand which is between the feed point and jet of fluid, (3) deplasticizing the strand before it enters the jet of fluid, and then (4) back-twisting that portion of the strand which is between the fluid jet and the takeup point, both initial and back-twisting being accomplished by the false-twisting action of the jet of fluid.

16. A method of producing a voluminous yarn, said method comprising [drawing] *withdrawing* a yarn from a source of supply at one linear speed, forwarding the yarn at a higher linear speed to a zone in which false-twist is imparted to said yarn, so as to [stretch] *cold-draw* said yarn immediately before it enters said zone, setting in the fibers of the yarn the distortion imposed by said false-twist, withdrawing the yarn from said zone and collecting it at a linear speed less than that at which it was fed into said zone.

[17. Method according to claim 16, comprising stretching the yarn, without softening it.]

*18. A method of producing a voluminous yarn, said method comprising withdrawing a yarn from a source of supply at one linear speed, forwarding the yarn at a higher linear speed to a zone in which false-twist is imparted to said yarn, so as to stretch the yarn sufficiently to draw said yarn immediately before it enters said zone, setting in the fibers of the yarn the distortion imposed by said false-twist, withdrawing the yarn from said zone and collecting it at a linear speed less than that at which it was fed into said zone.*

References Cited

The following references, cited by the Examiner, are of record in the patented file of this patent or the original patent.

UNITED STATES PATENTS

| | | | |
|---|---|---|---|
| 2,100,588 | 11/1937 | Claus | 57—34 B |
| 2,173,789 | 9/1939 | Nikles et al. | 57—34 B |
| 2,302,790 | 11/1942 | Modigliani | 57—34 B |
| 2,309,095 | 1/1943 | Bry | 57—160 |
| 2,515,299 | 7/1950 | Foster et al. | 57—157 F |
| 2,526,775 | 10/1950 | Slayter et al. | 57—34 B |
| 2,557,433 | 6/1951 | Honig | 57—156 |
| 2,700,866 | 2/1955 | Strang | 57—156 |
| 2,731,789 | 1/1956 | Holder | 57—160 |
| 2,869,318 | 1/1959 | Stucki | 57—157 T/S |
| 2,890,568 | 6/1959 | Willens | 57—157 T/S |
| 3,116,588 | 1/1964 | Breen et al. | 57—34 B |

JOHN PETRAKES, Primary Examiner

U.S. Cl. X.R.

57—157 S, 157 F